United States Patent
Katsuragi et al.

(10) Patent No.: US 11,552,949 B2
(45) Date of Patent: *Jan. 10, 2023

(54) SHARED TERMINAL THAT AUTHENTICATES A USER BASED ON A TERMINAL IDENTIFIER

(71) Applicant: Ricoh Company, Ltd., Tokyo (JP)

(72) Inventors: Shiho Katsuragi, Kanagawa (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/841,701

(22) Filed: Apr. 7, 2020

(65) Prior Publication Data

US 2020/0236107 A1    Jul. 23, 2020

Related U.S. Application Data

(63) Continuation of application No. 15/699,059, filed on Sep. 8, 2017, now Pat. No. 10,681,047.

(30) Foreign Application Priority Data

Sep. 8, 2016 (JP) .................. 2016-175824
Sep. 5, 2017 (JP) .................. 2017-170323

(51) Int. Cl.
*H04L 9/40* (2022.01)
*G06F 21/62* (2013.01)
(Continued)

(52) U.S. Cl.
CPC ...... *H04L 63/0876* (2013.01); *G06F 21/6218* (2013.01); *H04L 51/08* (2013.01);
(Continued)

(58) Field of Classification Search
CPC . H04L 63/0876; H04L 51/08; G06F 21/6218; G06F 3/1454; G09G 3/008;
(Continued)

(56) References Cited

U.S. PATENT DOCUMENTS

| 2004/0070616 A1 | 4/2004 | Hildebrandt et al. |
| 2004/0128354 A1 | 7/2004 | Horikiri et al. |

(Continued)

FOREIGN PATENT DOCUMENTS

| JP | 2000-250661 | 9/2000 |
| JP | 2001-292266 | 10/2001 |

(Continued)

OTHER PUBLICATIONS

Extended Search Report dated Feb. 2, 2018 in European Patent Application No. 17189680.6.

(Continued)

*Primary Examiner* — Henry Tsang
(74) *Attorney, Agent, or Firm* — Xsensus LLP

(57) ABSTRACT

A shared terminal includes: circuitry to control a display to display an image to a plurality of users, the plurality of users sharing a use of the shared terminal, and obtain, from a first privately-owned terminal owned by a first user of the plurality of users, first terminal identification information for identifying the first privately-owned terminal; a transmitter to transmit, to a terminal management server, an authentication request for authenticating the first privately-owned terminal to allow login of the first user into the shared terminal, the authentication request including the first terminal identification information of the first privately-owned terminal; and a receiver to receive an authentication result indicating whether the first privately-owned terminal is authenticated to allow login of the first user, from the terminal management server. When the authentication result (Continued)

indicates that the first privately-owned terminal is a legitimate terminal and login of the first user is successful, the circuitry controls the display to display a screen for allowing the plurality of users including the first user to draw an image. When the authentication result indicates that the first privately-owned terminal is not a legitimate terminal and login of the first user fails, the circuitry controls the display to display a screen with an error message.

20 Claims, 27 Drawing Sheets

(51) Int. Cl.
    *H04L 51/08*     (2022.01)
    *G06F 3/14*     (2006.01)
    *G09G 3/00*     (2006.01)
    *H04N 1/00*     (2006.01)

(52) U.S. Cl.
    CPC ........... *G06F 3/1454* (2013.01); *G09G 3/008* (2013.01); *G09G 2354/00* (2013.01); *G09G 2358/00* (2013.01); *G09G 2370/022* (2013.01); *H04N 1/00114* (2013.01)

(58) Field of Classification Search
    CPC ........... G09G 2354/00; G09G 2358/00; G09G 2370/022; H04N 1/00114
    See application file for complete search history.

(56) References Cited

U.S. PATENT DOCUMENTS

| | | |
|---|---|---|
| 2005/0289126 A1 | 12/2005 | Koguchi |
| 2007/0140557 A1 | 6/2007 | Osada |
| 2009/0279134 A1* | 11/2009 | Fujii .................. H04N 1/0097 358/1.15 |
| 2010/0205449 A1* | 8/2010 | Eun ...................... G06Q 50/265 713/185 |
| 2011/0083109 A1 | 4/2011 | Hildebrandt et al. |
| 2013/0120784 A1* | 5/2013 | Takagi ............... H04N 1/00912 358/1.14 |
| 2014/0282991 A1 | 9/2014 | Watanabe et al. |
| 2014/0313539 A1 | 10/2014 | Kawano |
| 2015/0120857 A1 | 4/2015 | Nagai |
| 2015/0332037 A1* | 11/2015 | Tse .......................... G06F 21/35 726/19 |
| 2015/0339561 A1* | 11/2015 | Takenaka ................. G06F 1/00 358/1.14 |
| 2016/0105568 A1 | 4/2016 | Yamashita |
| 2017/0011227 A1 | 1/2017 | Tse et al. |
| 2017/0177190 A1 | 6/2017 | Inoue et al. |

FOREIGN PATENT DOCUMENTS

| | | |
|---|---|---|
| JP | 2009-130435 | 6/2009 |
| JP | 2013-235142 | 11/2013 |
| JP | 2013-247545 A | 12/2013 |
| JP | 2016-082332 A | 5/2016 |
| WO | WO 2004/109496 A2 | 12/2004 |
| WO | WO 2015/175586 A1 | 11/2015 |

OTHER PUBLICATIONS

Office Action dated Mar. 30, 2021 in Japanese Patent Application No. 2017-170323, 3 pages.

* cited by examiner

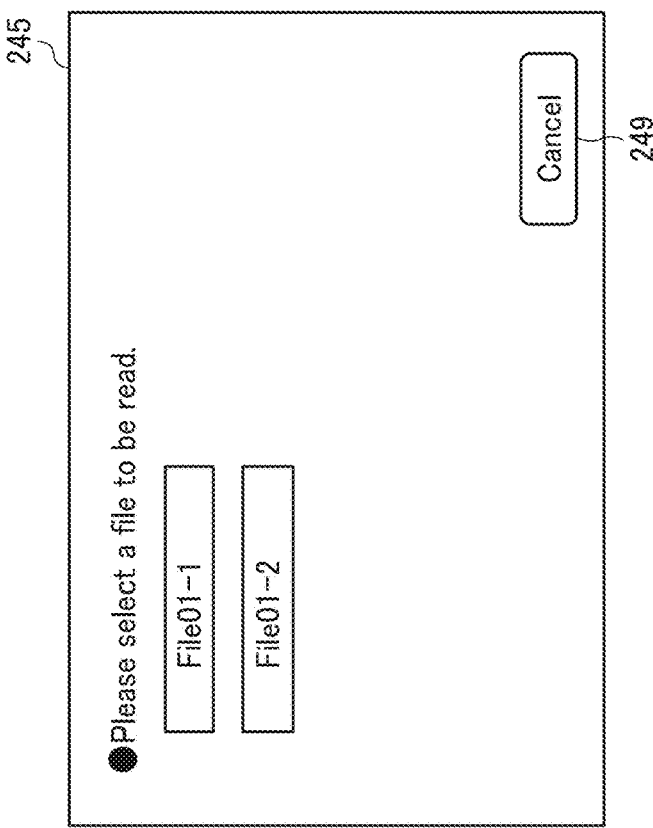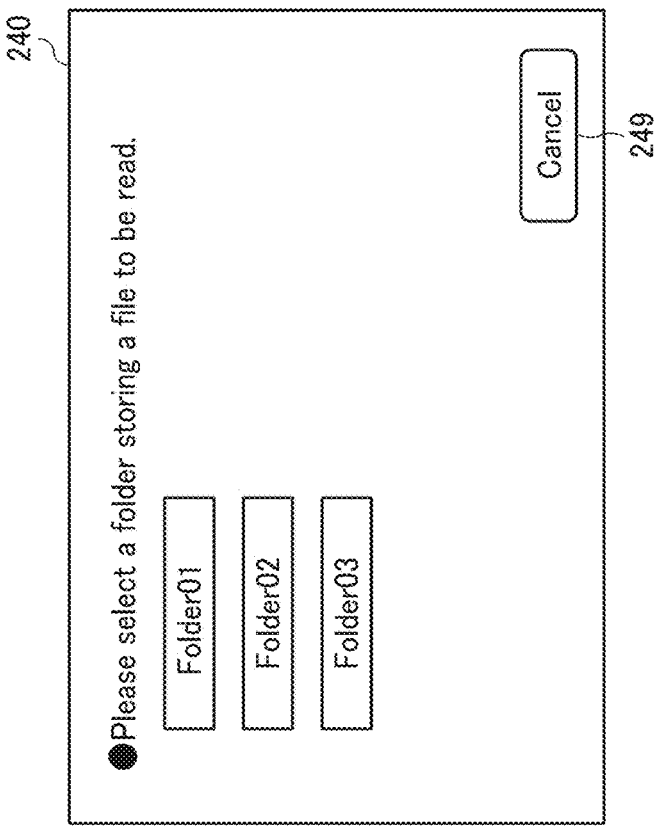

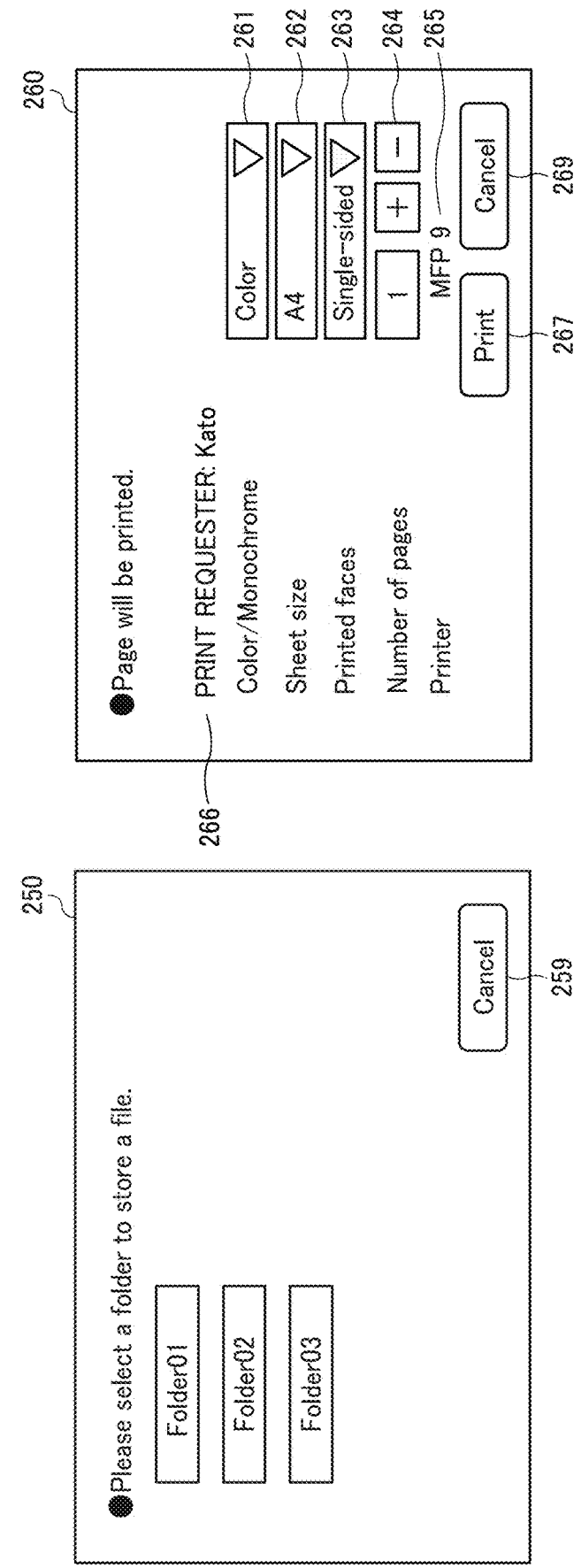

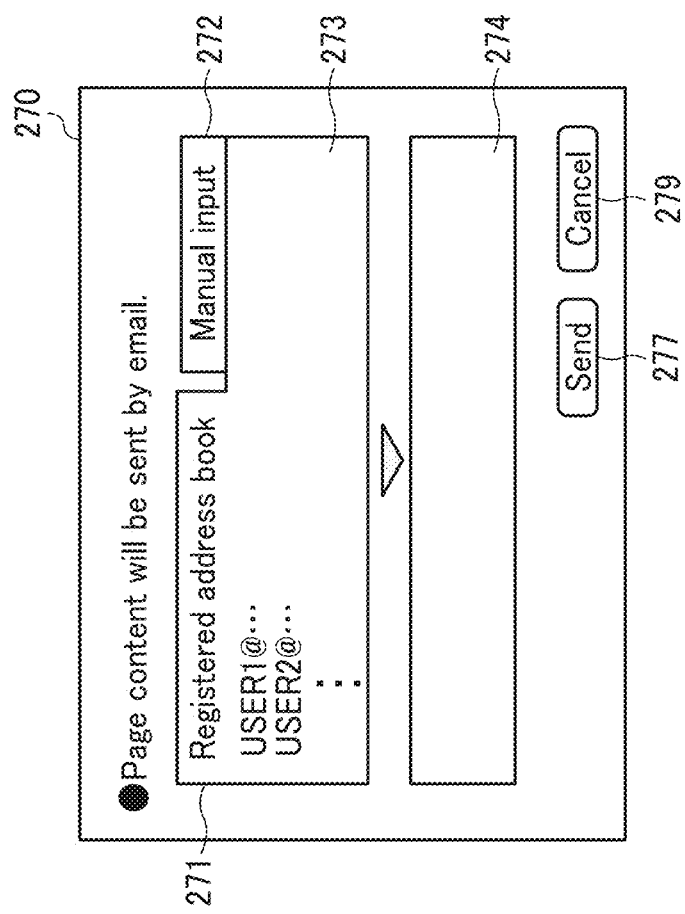

| TERMINAL ID | USER ID | USER NAME |
|---|---|---|
| aaa | 10001 | Kato |
| bbb | 10002 | Jim |
| ... | ... | ... |

FIG. 12B

| USER ID | EMAIL ADDRESS |
|---|---|
| 10001 | aaa@xxx.co.jp |
| 10002 | bbb@xxx.co.jp |
| ... | ... |

FIG. 12C

| USER NAME (PRINT REQUESTER NAME) | FILE NAME | PRINT CONFIGURATION PARAMETER |
|---|---|---|
| Kato | 1001 | COLOR, A4, ··· |
| Kato | 1002 | MONOCHROME, A4, ··· |
| Jim | 2001 | COLOR, A3, ··· |
| ... | ... | ... |

SHARED TERMINAL THAT AUTHENTICATES A USER BASED ON A TERMINAL IDENTIFIER

CROSS-REFERENCE TO RELATED APPLICATIONS

This patent application is a continuation of U.S. application Ser. No. 15/699,059, filed Sep. 8, 2017, which claims priority pursuant to 35 U.S.C. § 119(a) to Japanese Patent Application Nos. 2016-175824, filed on Sep. 8, 2016, and 2017-170323, filed on Sep. 5, 2017, in the Japan Patent Office, the entire disclosure of each is hereby incorporated by reference herein.

BACKGROUND

Technical Field

The present invention relates to a shared terminal, communication system, display control, and recording medium.

Description of the Related Art

Recently, electronic whiteboards are disposed in various types of places such as meeting rooms in companies or classrooms in educational institutions. The electronic whiteboard is provided with a touch panel display of large size, on which each user draws an image with an electronic pen or his or her finger. The image drawn by each user is displayed to a plurality of users in the same room. Through sharing the image between the users, a meeting or a lecture can be conducted more smoothly.

SUMMARY

Example embodiments of the present invention include a shared terminal, including: circuitry to control a display to display an image to a plurality of users, the plurality of users sharing a use of the shared terminal, and obtain, from a first privately-owned terminal owned by a first user of the plurality of users, first terminal identification information for identifying the first privately-owned terminal; a transmitter to transmit, to a terminal management server, an authentication request for authenticating the first privately-owned terminal to allow login of the first user into the shared terminal, the authentication request including the first terminal identification information of the first privately-owned terminal; and a receiver to receive an authentication result indicating whether the first privately-owned terminal is authenticated to allow login of the first user, from the terminal management server. When the authentication result indicates that the first privately-owned terminal is a legitimate terminal and login of the first user is successful, the circuitry controls the display to display a screen for allowing the plurality of users including the first user to draw an image. When the authentication result indicates that the first privately-owned terminal is not a legitimate terminal and login of the first user fails, the circuitry controls the display to display a screen with an error message.

Example embodiments of the present invention include a communication system including the shared terminal.

Example embodiments of the present invention include a display control method performed by the shared terminal, and a non-transitory recording medium storing an image display control program for causing the shared terminal to perform the display control method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 9A, 9B, 9C, and 9D (FIG. 9) are an illustration of example screens displayed by the display at the electronic whiteboard;

FIGS. 10A, 10B, and 10C (FIG. 10) are an illustration of example screens displayed by the display at the electronic whiteboard:

FIG. 12A is a conceptual diagram illustrating a terminal management table, according to an embodiment;

FIG. 12B is a conceptual diagram illustrating a destination management table, according to an embodiment;

FIG. 12C is a conceptual diagram illustrating a print data management table, according to an embodiment.

Figure 1:
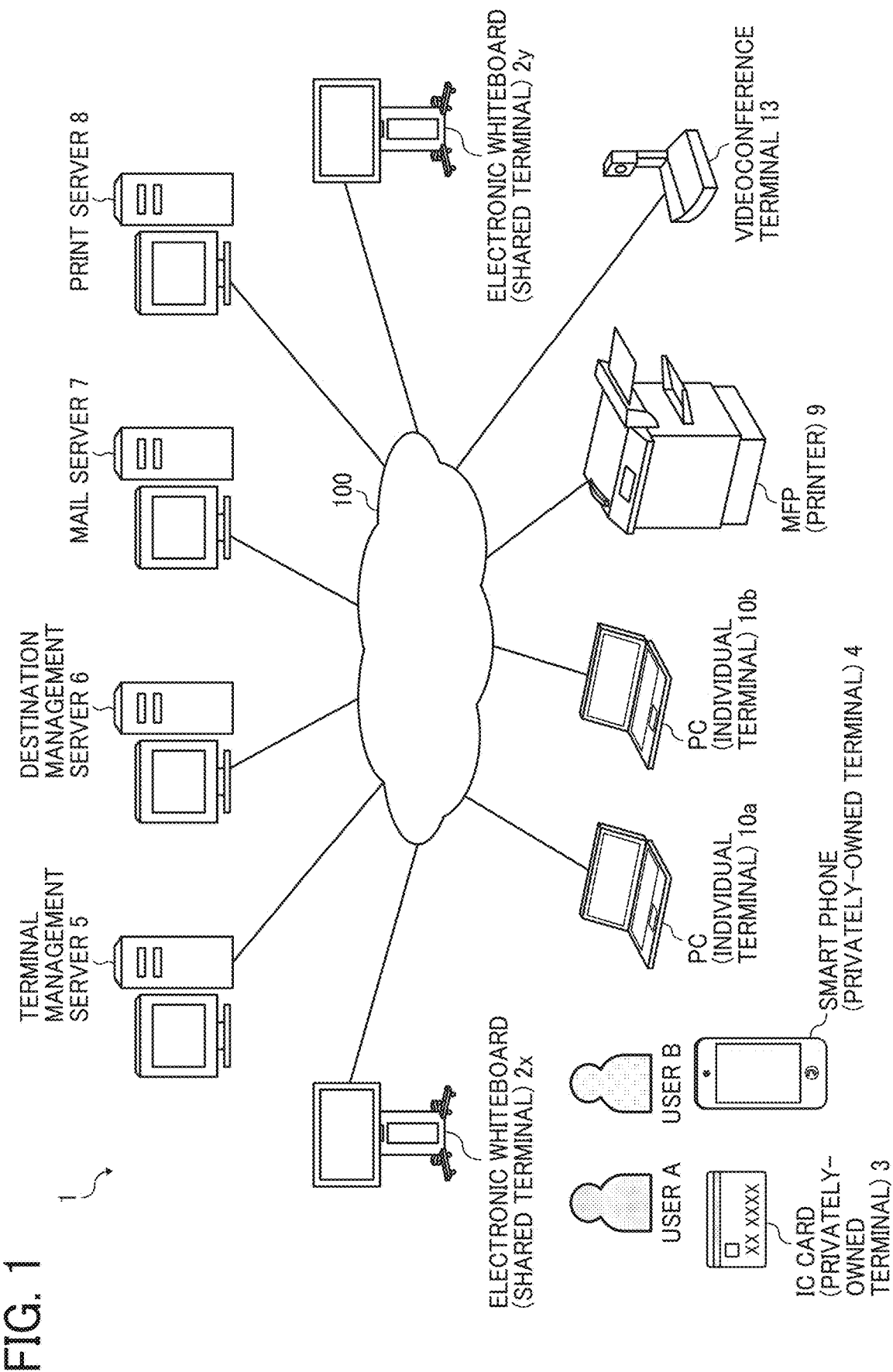
FIG. 1 is a schematic diagram illustrating a communication system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, a communication system 1 is described in detail according to embodiments.

<Overview of System Configuration>

First, an overview of a configuration of the communication system 1 is described according to an embodiment. FIG. 1 is a schematic diagram illustrating a configuration of the communication system 1 according to the embodiment.

As illustrated in FIG. 1, the communication system 1 of the embodiment includes an electronic whiteboard 2x, an electronic whiteboard 2y, an IC card 3, a smart phone 4, a terminal management server 5, a destination management server 6, a mail server 7, a print server 8, an MFP 9, PCs 10a and 10b, and a videoconference terminal 13. For simplicity, in the following, any arbitrary one of the electronic whiteboards 2x and 2y is referred to as the "electronic whiteboard 2". Any arbitrary one of the PCs 10a and 10b is referred to as the "PC 10".

The electronic whiteboard 2, the terminal management server 5, the destination management server 6, the mail server 7, the print server 8, the MFP 9, the PC 10, and the videoconference terminal 13 are communicable with one another through a communication network 100. The communication network 100 is implemented by the Internet, mobile communication network, local area network (LAN), etc. The communication network 100 may include, in addition to a wired network, a wireless network in compliance with such as 3rd Generation (3G), Worldwide Interoperability for Microwave Access (WiMAX), Long Term Evolution (LTE), etc. The electronic whiteboard 2, IC card 3, and smart phone 4 are communicable with one another using a near-distance communication technology in compliance with such as Near Field Communication (NFC) (Registered Trademark). The smart phone 4 may communicate with the electronic whiteboard 2 using the near-distance communication technology in compliance with such as Bluetooth (Registered Trademark).

One of the electronic whiteboard 2a and the electronic whiteboard 2b transmits or receives drawing image data representing a content drawn by a user ("drawing image data"), to or from the other one of the electronic whiteboard 2a and the electronic whiteboard 2b. That is, the content drawn at the electronic whiteboard 2a is displayed at the electronic whiteboard 2b, and the content drawn at the electronic whiteboard 2b is displayed at the electronic whiteboard 2a.

The electronic whiteboard 2 generates image data in Refined Printing Command Stream (PRCS) based on the drawing image data, and transmits the generated image data to the MFP 9 through the communication network 100. The MFP 9 prints a drawing image based on the image data received from the electronic whiteboard 2. In another example, the electronic whiteboard 2 generates image data in Portable Document Format (PDF) based on the drawing image data, and transmits an electronic mail attached with the generated image data to the PC 10 through the communication network 100. The PC 10 displays a drawing image based on the image data extracted from the electronic mail.

The electronic whiteboard 2 may display an image other than the drawing image drawn by the user ("non-drawing image"), such as an image of a presentation material. The electronic whiteboard 2 generates image data in PRCS based on non-drawing image data, and transmits the generated image data to the MFP 9 through the communication network 100. In another example, the electronic whiteboard 2 generates image data in PDF based on the non-drawing image data, and transmits an electronic mail attached with the generated image data to the PC 10 through the communication network 100.

In this disclosure, the image data in PRCS and the image data in PDF each represent a content of a drawing image drawn by a user, or a non-drawing image displayed by a user, for example. The electronic whiteboard 2 is an example of a shared terminal to be shared by a plurality of users, such that the plurality of users can view the same image at a same time. The IC card 3 and the smart phone 4 are an example of a privately-owned terminal, privately owned by each user. Preferably, the privately-owned terminal is a portable terminal, which is easily carried with the user, such as to the meeting. The MFP 9 is an example of a printer. The PC 10 is an example of an individual terminal operated by an individual user. Examples of the PC 10 include a desktop PC, a notebook PC, and a tablet. In this disclosure, the individual terminal is a terminal that is operated by the user such as a terminal owned by the user. The PC 10 does not have to be brought to the meeting, as long as the user is able to access his or her email address using the PC 10.

Further, the image data may be generated not only in PRCS, but in any other desired format such as a printer control language (PCL), page description language (PDL), or Post Script (PS).

In FIG. 1, the user A, who owns the IC card 3, brings the IC card 3 to a meeting being held with the electronic whiteboard 2. The user B, who owns the smart phone 4, brings the smart phone 4 to the meeting being held with the electronic whiteboard 2. The PC 10a is any PC owned by the user A. The PC 10b is any PC owned by the user B. In one example, the electronic whiteboard 2 may have a videoconference capability, to carry out a videoconference with the videoconference terminal 13 by communicating video data and audio data through the communication network 100.

The terminal management server 5 manages, for each privately-owned terminal, terminal identification (ID) identifying the privately-owned terminal. The destination management server 6 manages an email address of the user. In this example, the user is able to check his or her emails through the PC 10 individually owned by each user. More specifically, the destination management server 6 stores an email address of the user in association with a user ID of the user. The mail server 7 controls transmission or reception of electronic mails (emails) through the communication network 100. The print server 8 is a server capable of performing secure printing. The print server 8 stores data reflecting the image data transmitted from the electronic whiteboard 2 or PC 10 (in this disclosure, print data), and, in response to a request from the MFP 9, transmits the data reflecting the image data to the MFP 9.

<Hardware Configuration>

Referring to FIGS. 2 to 7, a hardware configuration of the apparatus or terminal in the communication system 1 is described according to the embodiment.

<Hardware Configuration of Electronic Whiteboard>

Figure 2:
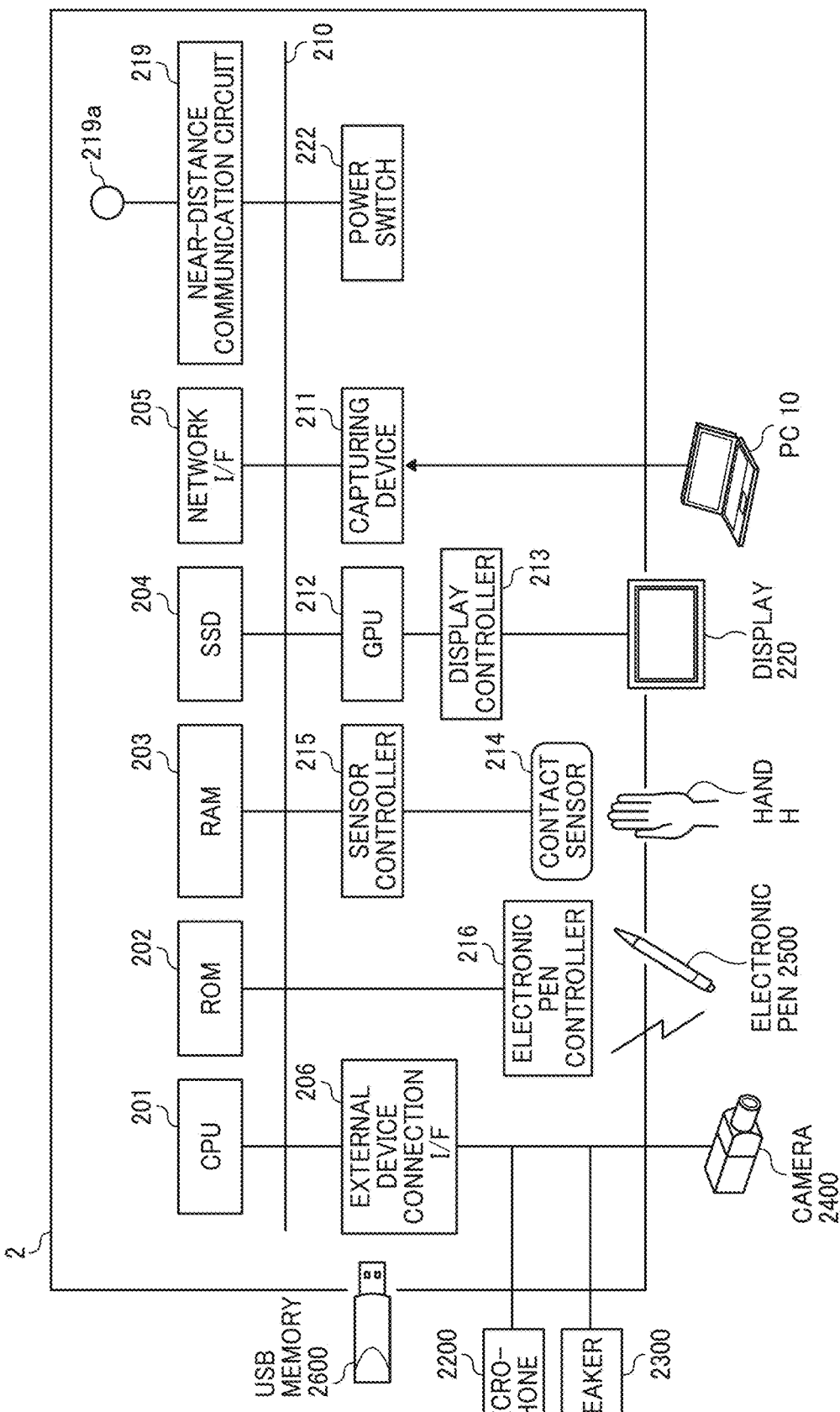
FIG. 2 is a schematic block diagram illustrating a hardware configuration of an electronic whiteboard, according to an embodiment.

FIG. 2 is a diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 2. The ROM 202 stores a control program for operating the CPU 201 such as an Initial Program Loader (IPL). The RAM 203 is used as a work area for the CPU 201. The SSD 204 stores various data such as the control program for the electronic whiteboard 2. The network I/F 205 controls communication with an external device through the communication network 100. The external device connection I/F 206 controls communication with a USB memory 2600, and external devices such as a camera 2400, a speaker 2300, a microphone 2200, etc.

The electronic whiteboard 2 further includes a capturing device 211, a graphics processing unit (GPU) 212, a display controller 213, a contact sensor 214, a sensor controller 215, an electronic pen controller 216, a near-distance communication circuit 219, an antenna 219a for the near-distance communication circuit 219, and a power switch 222.

The capturing device 211 causes a display 508 of the PC 10 to display a still image or a video image based on image data that is captured by the capturing device 211. The GPU 212 is a semiconductor chip dedicated to processing a graphical image. The display controller 213 controls display of an image processed at the GPU 212 for output through a display 220 provided with the electronic whiteboard 2. The contact sensor 214 detects a touch onto the display 220 with an electronic pen 2500 or a user's hand H. The sensor controller 215 controls operation of the contact sensor 214. The contact sensor 715 senses a touch input to a specific coordinate on the display 220 using the infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the pen 15 to the display 220. The near-distance communication circuit 219 is a communication circuit that communicates in compliance with the NFC, the Bluetooth and the like.

The power switch 222 turns on or off the power of the electronic whiteboard 2.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the pen 15, the electronic pen controller 216 may also detect a touch by another part of the electronic pen 2500, such as a part held by a hand of the user.

<Hardware Configuration of IC Card>

Figure 3:
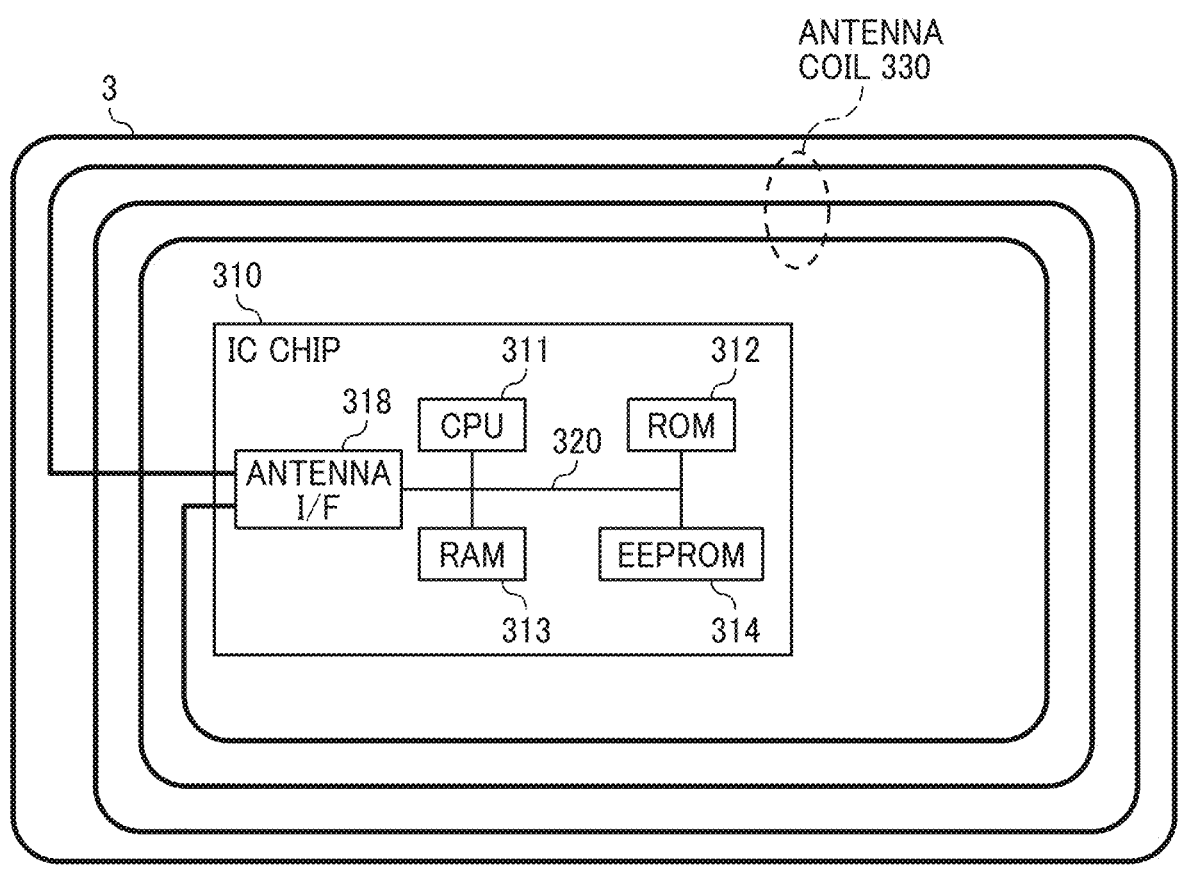
FIG. 3 is a schematic block diagram illustrating a hardware configuration of an integrated circuit (IC) card, according to an embodiment.

FIG. 3 is a diagram illustrating a hardware configuration of the IC card 3 according to the embodiment. In this disclosure, the contactless IC card is described, but contact IC card may be applied instead. As illustrated in FIG. 3, the IC card 3 includes an IC chip 310 and an antenna coil 330. The IC card 3 further includes a CPU 311, a ROM 312, a RAM 313, an Electrically Erasable and Programmable ROM (EEPROM) 314, and an antenna I/F 318.

The CPU 311 controls entire operation of the IC card 3. The ROM 312 stores a control program for operating the CPU 311. The RAM 313 is used as a work area for the CPU 311. The EEPROM 314 stores various data such as the control program for the IC card 3, and terminal ID for identifying the IC card 3, and the like. The antenna I/F 318 controls transmission or reception of data with an external device via the antenna coil 330.

The IC card 3 further includes a bus line 320. The bus line 320 is an address bus or a data bus, which electrically connects the elements in FIG. 3 such as the CPU 311.

The antenna coil 330 generates an electric current, which is induced as the IC card 3 passes an electromagnetic field generated by radio waves emitted from an external device such as a reader and writer. The IC card 3 uses the generated electric current to activate the IC chip 310, and communicates with the external device, that is the reader and writer, to obtain or provide data with the external device.

<Hardware Configuration of Smart Phone>

Figure 4:
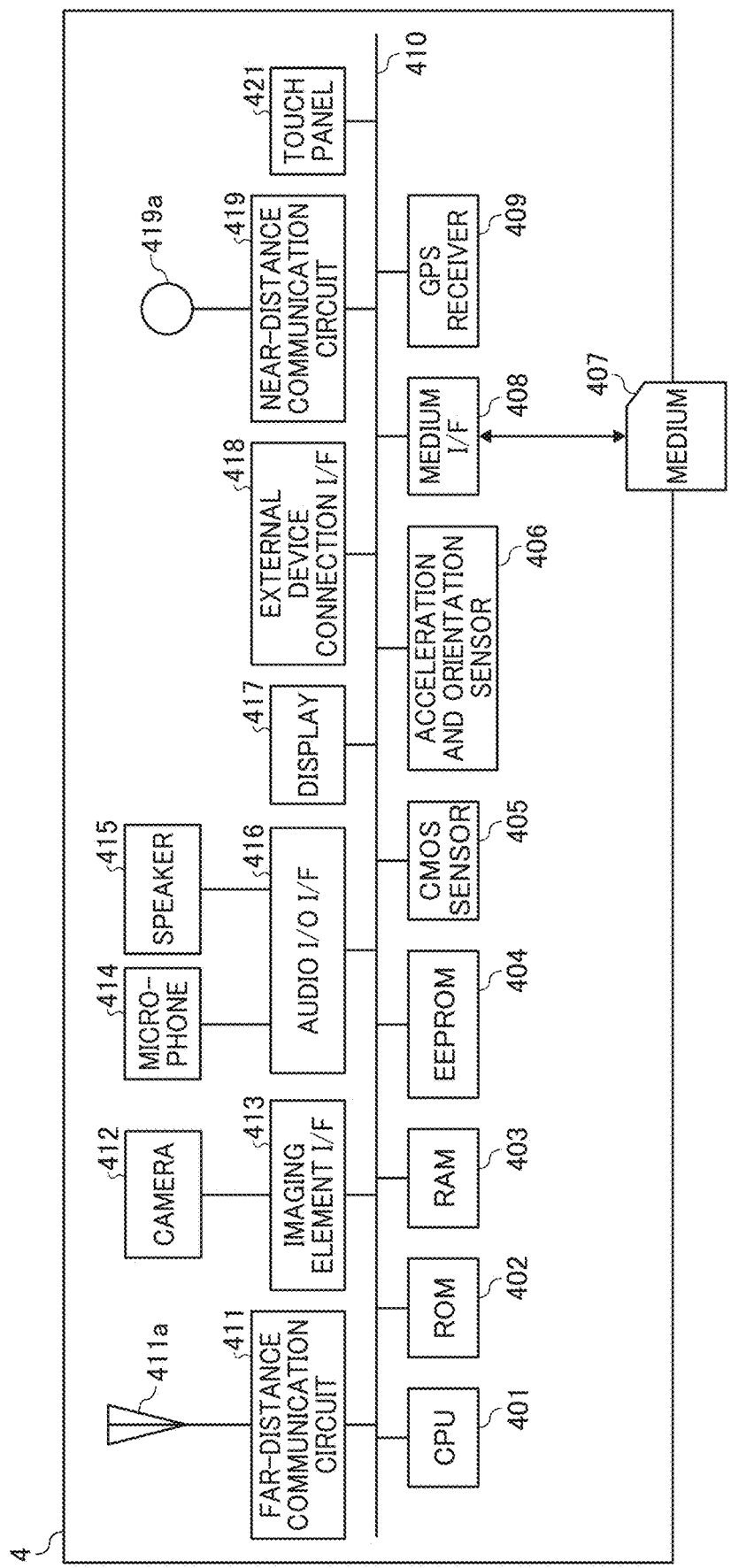
FIG. 4 is a schematic block diagram illustrating a hardware configuration of a smart phone, according to an embodiment.

FIG. 4 is a diagram illustrating a hardware configuration of the smart phone 4 according to the embodiment. As illustrated in FIG. 4, the smart phone 4 includes a CPU 401, a ROM 402, a RAM 403, an EEPROM 404, a Complementary Metal Oxide Semiconductor (CMOS) sensor 405, an acceleration and orientation sensor 406, a medium I/F 408, and a GPS receiver 409.

The CPU 401 controls entire operation of the smart phone 4. The ROM 402 stores a control program for controlling the CPU 401 such as an IPL. The RAM 403 is used as a work area for the CPU 401. The EEPROM 404 reads or writes various data such as a control program for the smart phone 4 under control of the CPU 401. The CMOS sensor 405 captures an object (mainly, the user operating the smart phone 4) under control of the CPU 401 to obtain captured image data. The acceleration and orientation sensor 406 includes various sensors such as an electromagnetic compass or gyrocompass for detecting geomagnetism, and an acceleration sensor. The medium L/F 408 controls reading or writing of data with respect to a recording medium 407 such as a flash memory. The GPS receiver 409 receives a GPS signal from a GPS satellite.

The smart phone 4 further includes a far-distance communication circuit 411, a camera 412, an imaging element I/F 413, a microphone 414, a speaker 415, an audio input/output I/F 416, a display 417, an external device connection I/F 418, a near-distance communication circuit 419, an antenna 419a for the near-distance communication circuit 419, and a touch panel 421.

The far-distance communication circuit 411 is a circuit that communicates with other device through the communication network 100. The camera 412 is an example of imaging device capable of capturing a subject under control of the CPU 401, and is incorporated in the smart phone 4. The imaging element I/F 413 is a circuit that controls driving of the camera 412. The microphone 414 is an example of audio collecting device capable of inputting audio under control of the CPU 401, and is incorporated in the smart phone 4. The audio I/O I/F 416 is a circuit for inputting or outputting an audio signal between the microphone 414 and the speaker 415 under control of the CPU 401. The display 417 may be a liquid crystal or organic electro luminescence (EL) display that displays an image of a subject, an operation icon, or the like. The external device I/F 418 is an interface circuit that connects the smart phone 4 to various external devices. The near-distance communication circuit 419 is a communication circuit that communicates in compliance with the NFC, the Bluetooth, and the like. The touch panel 421 is an example of input device that enables the user to input a user instruction through touching a screen of the display 417.

The smart phone 4 further includes a bus line 410. The bus line 410 is an address bus or a data bus, which electrically connects the elements in FIG. 4 such as the CPU 401.

<Hardware Configuration of Server and PC>

Figure 5:
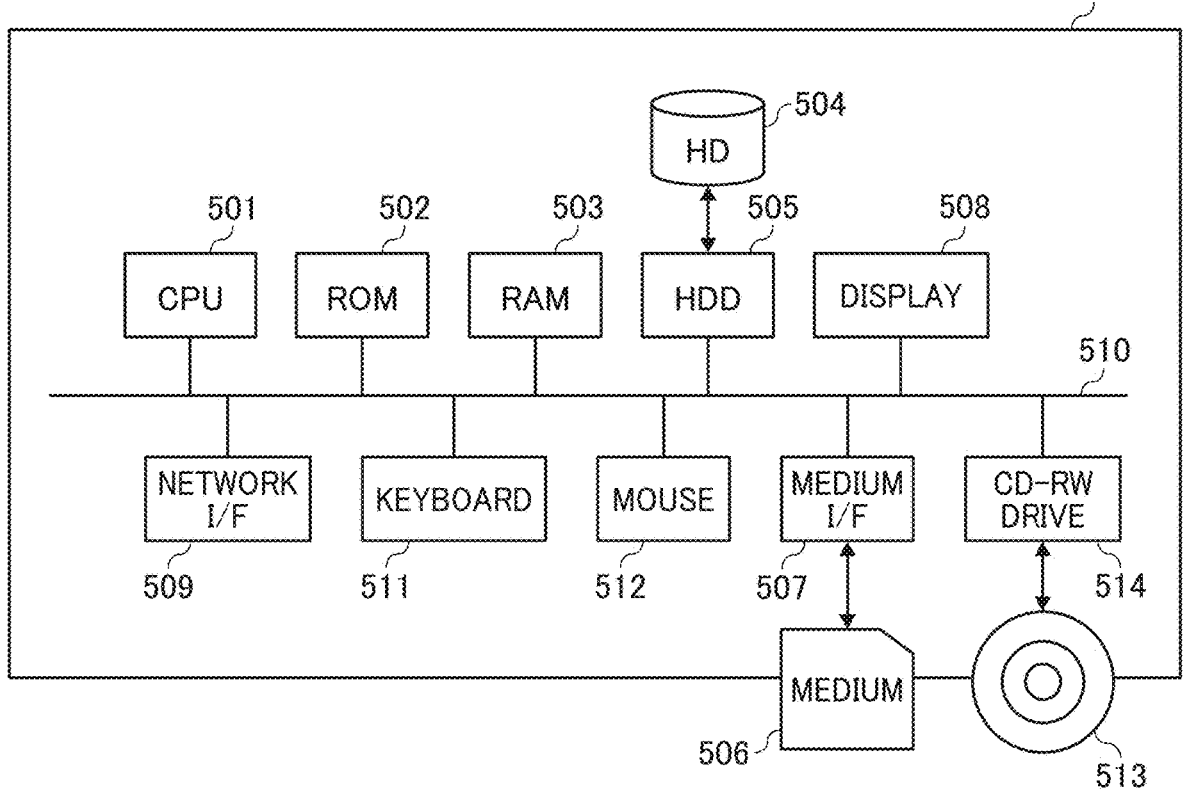
FIG. 5 is a schematic block diagram illustrating a hardware configuration of a personal computer (PC), according to an embodiment.

FIG. 5 is a diagram illustrating a hardware configuration of the server and the PC, according to the embodiment. In this disclosure, since the terminal management server 5, destination management server 6, mail server 7, print server 8, PC 10a, and PC 10b have a substantially the same hardware structure, a hardware configuration of the terminal management server 5 is described below as an example. In the following description, even in case of describing the hardware configuration of the destination management server 6, mail server 7, print server 8, PC 10a, and PC 10b, the elements in FIG. 5 are referred.

As illustrated in FIG. 5, the terminal management server 5, which may be implemented by a computer, includes a CPU 501, a ROM 502, a RAM 503, a hard disk (HD) 504, a hard disk drive (HDD) 505, a recording medium 506, a medium I/F 507, a display 508, a network I/F 509, a keyboard 511, a mouse 512, a CD-RW drive 514, and a bus line 510. Since the terminal management server 5 operates as a server, an input device such as the keyboard 511 and the mouse 512, or an output device such as the display 508 does not have to be provided.

The CPU 501 controls entire operation of the terminal management server 5. The ROM 502 stores a control program for controlling the CPU 501 such as an IPL. The RAM 503 is used as a work area for the CPU 501. The HD 504 stores various data such as a control program. The HDD 505 controls reading or writing of various data to or from the HDD 504 under control of the CPU 501. The medium I/F 507 controls reading or writing of data with respect to a recording medium 506 such as a flash memory. The display 508 displays various information such as a cursor, menu, window, characters, or image. The network 1F 509 is an interface that controls communication of data with an external device through the communication network 100. The keyboard 511 is one example of input device provided with a plurality of keys for allowing a user to input characters, numerals, or various instructions. The mouse 512 is one example of input device for allowing the user to select a specific instruction or execution, select a target for processing, or move a curser being displayed. The CD-RW drive 514 reads or writes various data with respect to a Compact Disc RW (CD-RW) 513, which is one example of removable recording medium.

The terminal management server 5 further includes a bus line 510. The bus line 510 may be an address bus or a data bus, which electrically connects various elements such as the CPU 501 of FIG. 5.

<Hardware Configuration of MFP>

Figure 6:
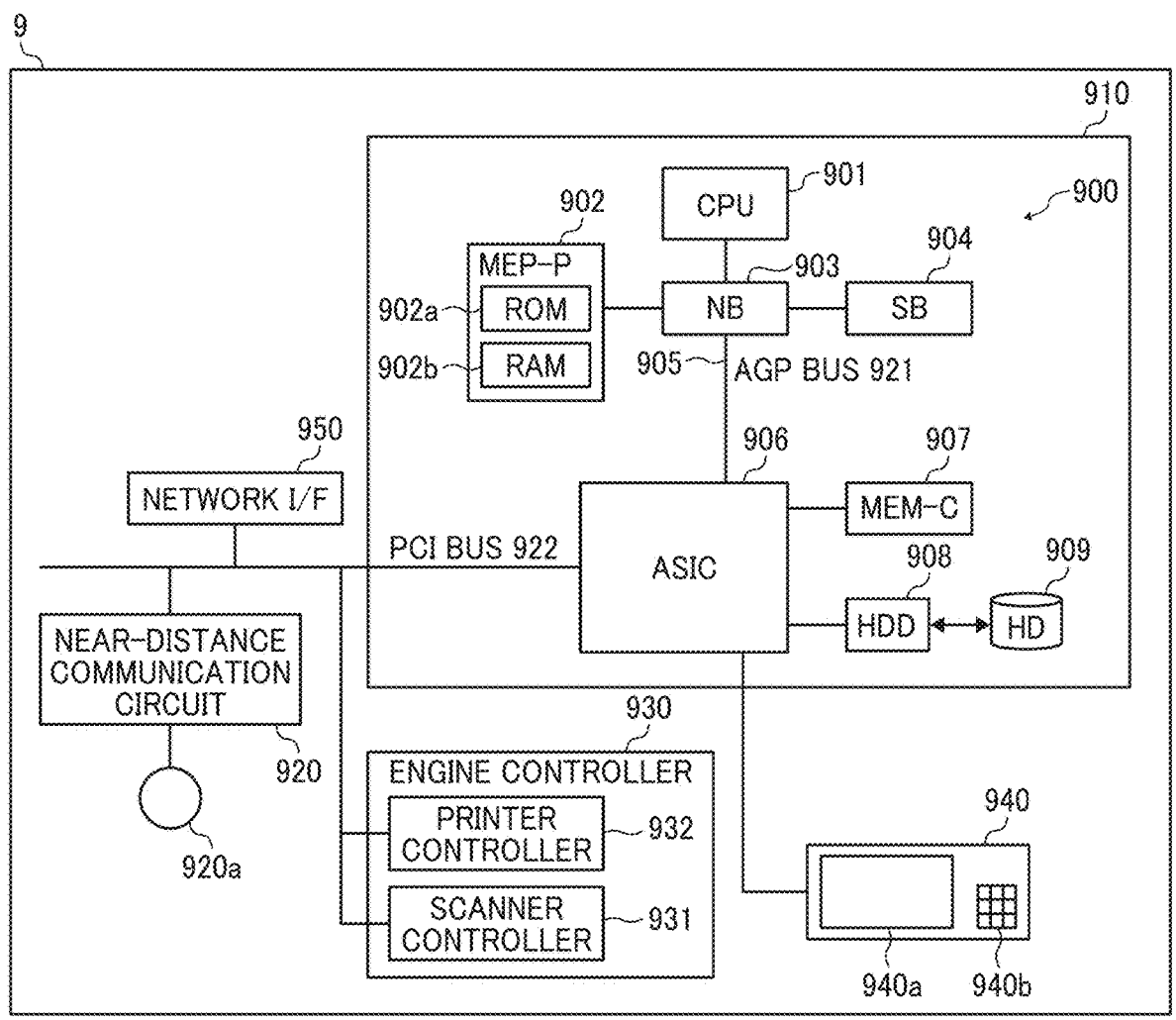
FIG. 6 is a schematic block diagram illustrating a hardware configuration of a multifunctional peripheral (MFP), according to an embodiment.

FIG. 6 is a diagram illustrating a hardware configuration of the MFP 9, according to the embodiment. As illustrated in FIG. 6, the MFP 9 includes a controller 901, a near-distance communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, a HDD 908, and a HD 909. The NB 903 and the ASIC 906 are connected through an Accelerated Graphics Port (AGP) bus 921.

The CPU 901 controls entire operation of the MFP 9. The NB 903 connects the CPU 901, with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for achieving various functions of the controller 910. The MEM-P 902 further includes a RAM 902b as a memory that deploys the program and data, or as a drawing memory that stores drawing data for printing. The program stored in the RAM 902b may be stored in any computer-readable recording medium, such as a CD-ROM, CD-RW, floppy disk (FD), CD-R, or DVD, in a file format installable and executable by the computer, for distribution.

The SB 904 connects the NB 903 with a PCI bus 922 or a peripheral device. The ASIC 906 is an integrated circuit (IC) privately-owned to image processing, and connects the AGP bus 905, PCI bus 922, HDD 908, and MEM-C 907. The ASIC 906 includes a PCI target, an AGP master, an arbiter (ARB) as a central processor, a memory controller for controlling the MEM-C 907, a plurality of direct memory access controllers (DMACs) capable of converting coordinates of image data with a hardware logic, and a PCI unit that transfers data between the scanner controller 931 and the printer controller 932 through the PCI bus 922. The ASIC 906 may be connected to a Universal Serial Bus (USC) interface, or the Institute of Electrical and Electronics Engineers 1394 (IEEE 1394) interface.

The MEM-C 907 is a local memory, which is used as a buffer for image data to be printed or code image. The HD 909 stores various image data, font data for printing, and form data. The HDD 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, processes by the AGP bus 921 can be accelerated.

The near-distance communication circuit 920 is provided with an antenna 920a for the near-distance communication circuit 920. The near-distance communication circuit 920 is a communication circuit that communicates in compliance with the NFC, the Bluetooth, and the like.

The engine controller 930 includes a scanner controller 931 and a printer controller 932. The control panel 940 includes a display 940a and various keys 940b. The control panel 940 displays current settings or a selection screen, and is provided with a touch panel for receiving a user input. The keys 940b, which include such as a ten key and a Start key, are used by the user to enter set values of various image forming parameters such as image density parameter. The controller 910 controls entire operation of the MFP 9. In example operation, the controller 910 controls drawing, communication, or user inputs to the control panel 940. The scanner controller 931 and the printer controller 932 each perform various image processing, such as error diffusion or gamma conversion.

In response to an instruction to select a specific application through the control panel 940, for example, using a mode switch key, the MFP 9 selectively performs a document box function, copy function, print function, and facsimile function. When the document box function is selected, the MFP 9 changes its operating mode to a document box mode to store document data. With selection of the copy function, the MFP 90 operates in a copy mode. With selection of the print function, the MFP 9 operates in a printer mode. With selection of the facsimile function, the MFP 9 operates in a facsimile mode.

The network I/F 950 controls communication of data with an external device through the communication network 100. The near-distance communication circuit 920 and the network I/F 950 are electrically connected to the ASIC 906 via the PCI bus 922.

<Hardware Configuration of Videoconference Terminal>

Figure 7:
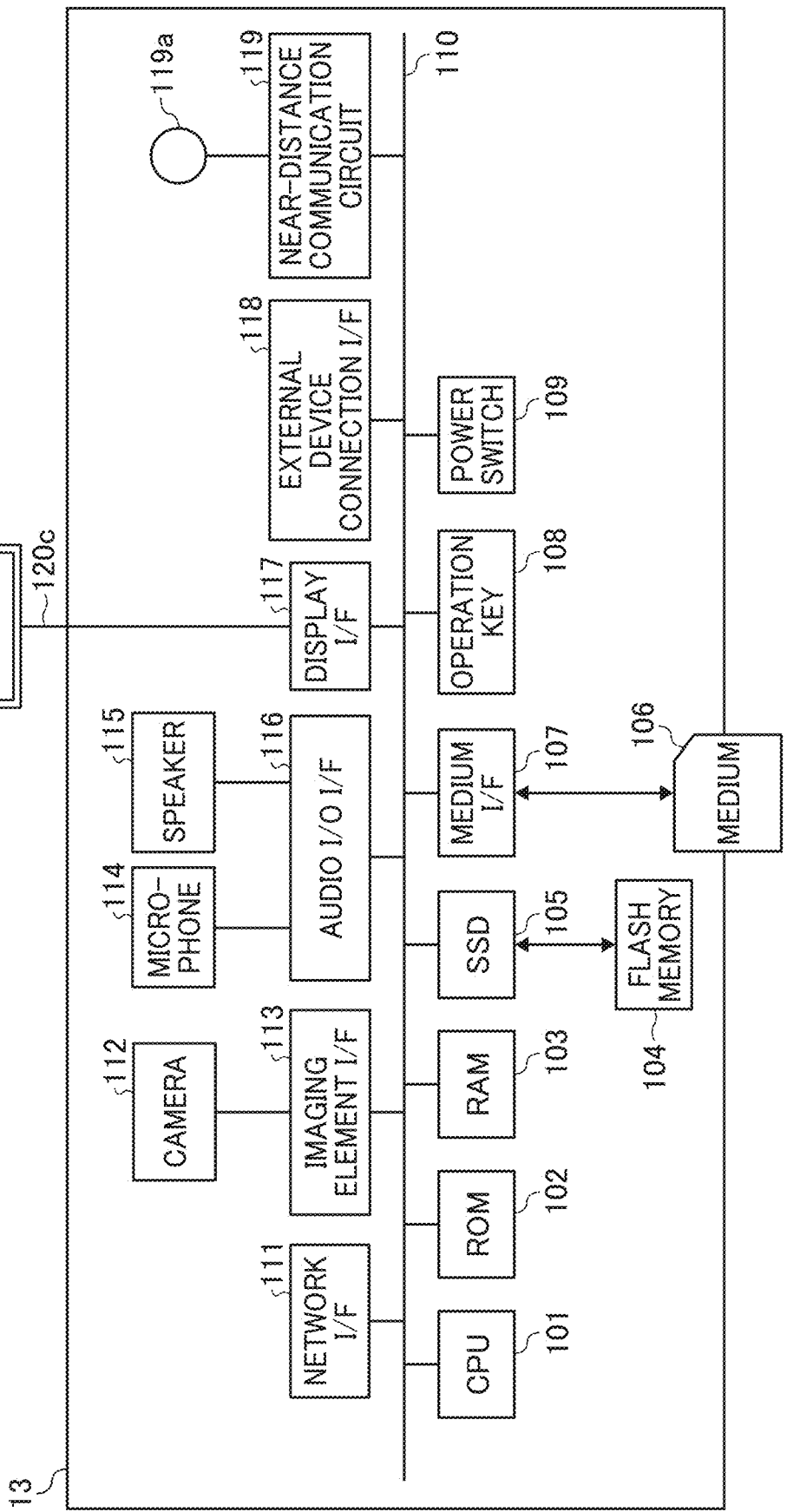
FIG. 7 is a schematic block diagram illustrating a hardware configuration of a videoconference terminal, according to an embodiment.

FIG. 7 is a diagram illustrating a hardware configuration of the videoconference terminal 13 according to the embodiment. As illustrated in FIG. 7, the videoconference terminal 13 includes a CPU 101, a ROM 102, a RAM 103, a flash memory 104, a SSD 105, a medium I/F 107, an operation key 108, a power switch 109, a bus line 110, a network I/F 111, a camera 112, an imaging element I/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the videoconference terminal 13. The ROM 102 stores a control program for controlling the CPU 101 such as an IPL. The RAM 103 is used as a work area for the CPU 101. The flash memory 104 stores various data such as a communication control program, image data, and audio data. The SSD 105 controls reading or writing of various data to or from the flash memory 104 under control of the CPU 101. In alternative to the SSD, a hard disk drive (HDD) may be used. The medium I/F 107 controls reading or writing of data with respect to a recording medium 106 such as a flash memory. The operation key (keys) 108 is operated by a user to input a user instruction such as a user selection of a communication destination of the videoconference terminal 13. The power switch 109 is a switch that receives an instruction to turn on or off the power of the videoconference terminal 13.

The network I/F 111 allows communication of data with an external device through the communication network 100 such as the Internet. The camera 112 is an example of built-in imaging device capable of capturing a subject under control of the CPU 101. The imaging element I/F 113 is a circuit that controls driving of the camera 112. The microphone 114 is an example of built-in audio collecting device capable of inputting audio under control of the CPU 101. The audio I/O I/F 116 is a circuit for inputting or outputting an audio signal between the microphone 114 and the speaker 115 under control of the CPU 101. The display I/F 117 is a circuit for transmitting image data to an external display 120 under control of the CPU 101. The external device connection I/F 118 is an interface circuit that connects the videoconference terminal 13 to various external devices. The near-distance communication circuit 119 is a communication circuit that communicates in compliance with the NFC, the Bluetooth, and the like.

The bus line 110 may be an address bus or a data bus, which electrically connects various elements such as the CPU 101 of FIG. 7.

The display 120 is an example of a displaying unit, such as a liquid crystal or organic electroluminescence (EL) display that displays an image of a subject, an operation icon, or the like. The display 120 is connected to the display I/F 117 by a cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a USB cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the videoconference terminal 13. The recording medium 106 can be any non-volatile memory that reads or writes data under control of the CPU 101, such that any memory such as an EEPROM may be used instead of the flash memory 104.

Example Screens of Electronic Whiteboard

Figure 8B:
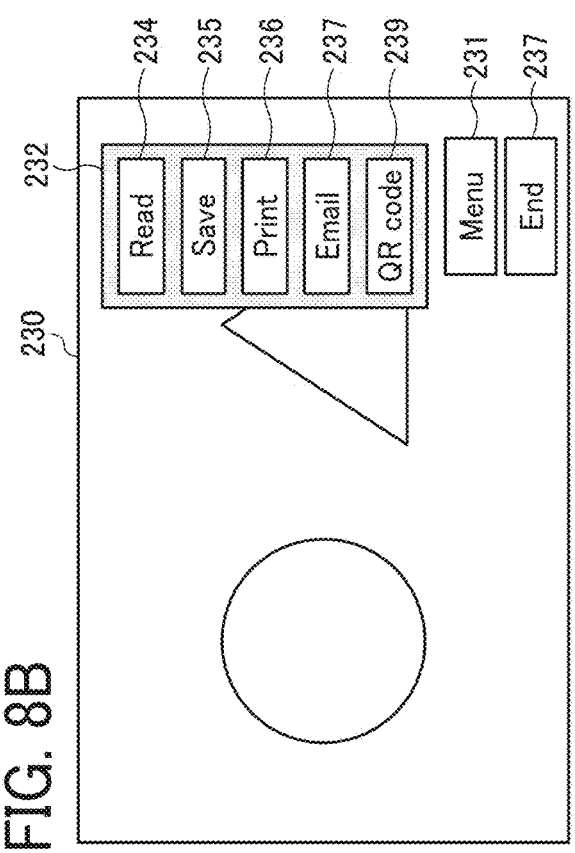
FIGS. 8A, 8B, and 8C (FIG. 8) are an illustration of example screens displayed by a display at the electronic whiteboard.
Figure 8A:
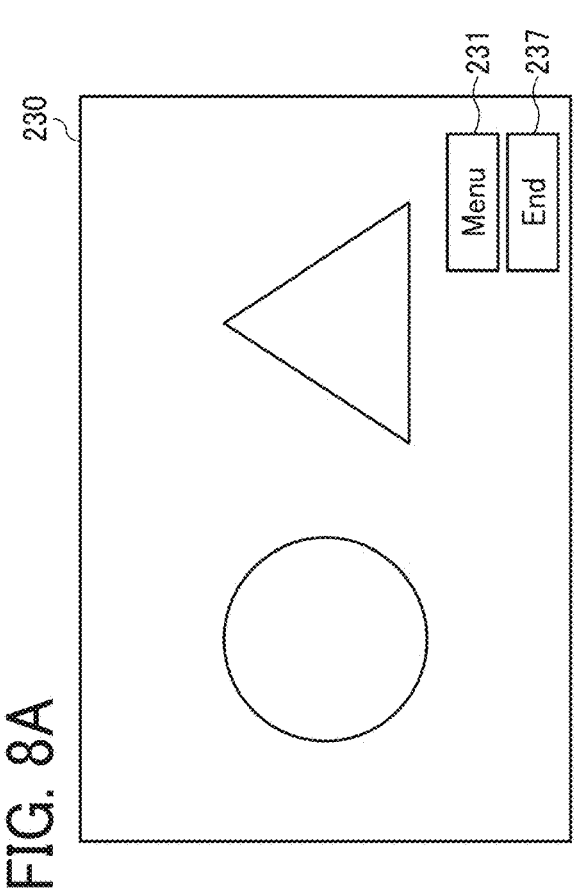

Referring to FIGS. 8 to 10, example screens of the electronic whiteboard 2 are described according to the embodiment. FIGS. 8 to 10 each illustrate a screen displayed by the electronic whiteboard 2. The electronic whiteboard 2 displays, on the display 220, a drawing image screen 230 as illustrated in FIG. 8A, for example. The drawing image screen 230 displays a drawing image (such as a circle and a triangle in figure) drawn by the user with such as the electronic pen 2500. The drawing image screen 230 displays a "Menu" button 231 and an "End" button 237 at the lower right. The "Menu" button 231 is a graphical image, when selected by the user, performs various types of functions of the electronic whiteboard 2. The "End" button 237 is a graphical image, when selected by the user, performs log out of the user to stop displaying a screen. When the user presses the "Menu" button 231 with such as the electronic pen 2500, as illustrated in FIG. 8B, the electronic whiteboard 2 displays, on the drawing image screen 230, a menu selection window (image) 232 for allowing selection of a function provided by the electronic whiteboard 2.

As illustrated in FIG. 8B, the menu selection window 232 includes a "Read" button 234, a "Save" button 235, a "Print" button 236, an "Email" button 237, and a "QR code" button 239.

Of those buttons, the "Read" button 234 is a graphical image, which, when selected, causes the electronic whiteboard 2 to read drawing image data that is stored in the SSD 204 after the image is drawn, for display onto the display 220. The "Save" button 235 is a graphical image, which, when selected, causes the electronic whiteboard 2 to store the drawing image drawn by the user in the SSD 204 as the drawing image data. The "Print" button 236 is a graphical image, which, when selected, causes the electronic whiteboard 2 to print the drawing image displayed on the drawing image screen 230 using such as the MFP 9. The "Email" button 237 is a graphical image, which, when selected, causes the electronic whiteboard 2 to transmit the drawing image displayed on the drawing image screen 230, as the drawing image data attached to the email. The "QR code" button 239 is a graphical image, which, when selected, causes the electronic whiteboard 2 to display, on the display 220, a QR code embedded with a device ID identifying the own device (that is, the electronic whiteboard 2).

Next, example screens to be displayed by the electronic whiteboard 2 when the buttons 234 to 237 and 239 are respectively selected, are described.

In response to pressing of the "Read" button 234 by the user, the electronic whiteboard 2 controls the display 220 to display a folder selection screen 240 as illustrated in FIG. 9A. The folder selection screen 240 displays a plurality of folder icons to be used for selecting a folder storing an electronic file to be read. When the user selects a desired folder icon ("folder 01", for example) with the electronic pen 2500, the electronic whiteboard 2 displays, on the display 220, a file selection screen 245 as illustrated in FIG. 9B. The file selection screen 245 displays a plurality of file icons to be used for selecting an electronic file to be read. When the user selects a desired file icon with the electronic pen 2500, the electronic whiteboard 2 displays, on the display 220, a drawing image screen 230 including a drawing image of the selected file, as illustrated in FIG. 8A.

In response to pressing of the "Save" button 235 by the user, the electronic whiteboard 2 controls the display 220 to display a folder selection screen 250 as illustrated in FIG. 9C. The folder selection screen 250 displays a plurality of folder icons to be used for selecting a folder to store an electronic file. The user selects the folder to store the electronic file, by selecting a desired folder icon with the electronic pen 2500.

In response to pressing of the "Print" button 236 by the user, the electronic whiteboard 2 controls the display 220 to display a print configuration screen 260 as illustrated in FIG. 9D. The print configuration screen 260 displays a name of a user who requests printing ("print requester"), various types of print parameters, and a pull-down menu to be used for changing a configuration for each of the print parameters. As the print requester, a user name of a user who has logged into the electronic whiteboard 10 is displayed. The print configuration screen 260 includes the menus 261 to 264, respectively, for selecting color or monochrome printing, selecting a sheet size (A4, A3, etc.), selecting faces to be printed (single-sided or duplex), and selecting the increase or decrease of a number of pages to be printed. The print configuration screen 260 further displays, in a field 265, a device name identifying a printer to print (in this example, "MFP 9"). The print configuration screen 260 displays a "Print" button 267 to be pressed by the user to start printing. For each of the screens illustrated in FIGS. 9A, 9B, 9C, and 9D, "Cancel" buttons 249, 259, and 269 are displayed to return to the drawing image screen 230 illustrated in FIG. 8A.

Figures 10B, 10C:
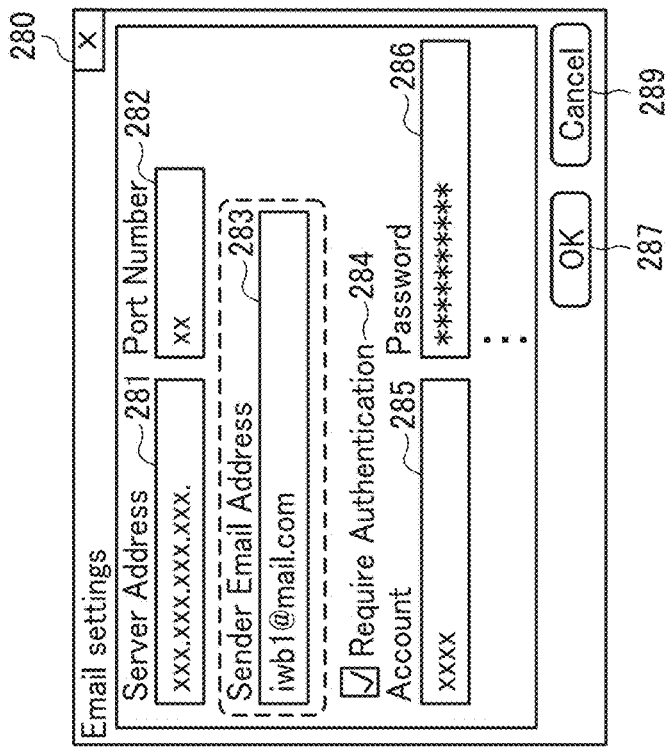

In response to pressing of the "Email" button 237 by the user, the display control 24 of the electronic whiteboard 2 controls the display 220 to display a destination configuration screen 270 illustrated in FIG. 10A. The destination configuration screen 270 includes a "Registered address book" tab 271 for showing registered email addresses, and a "Manual input" tab 272 for allowing the user to manually input an email address with such as the electronic pen 2500. In this example, a case where the "Registered address book" tab 271 is selected is displayed. The destination configuration screen 270 displays a registered address book field 273 that lists the registered email addresses. Below the registered address book field 273, an address configuration field 274 is provided, which displays an email address as a destination of email. The destination configuration screen 270 is configured to display, by default, an email address of the login user in the address configuration field 274. In this example, the email address (for example, "USER 1@ . . . ") that has been transmitted at S19 after the user A has logged in, is displayed. The destination configuration screen 270 displays a "Send" button 277 to be selected by the user to start transmission of email. In another example, the electronic whiteboard 2 may display an email configuration screen 280 as illustrated in FIG. 10B, as a screen to be displayed to an administrator or a service engineer, but not to the general user. The email configuration screen 280 includes a server address field 281, a port number field 282, a sender email address field 283, an authentication requirement field 284, an account field 285, and a password field 286.

The server address field 281 is a field to be entered with an IP address of the mail server 7. The port number field 282 is a field to be entered with a port number of a port that the mail server 7 opens to accept emails. The sender email field 283 is previously set with an email address assigned to the electronic whiteboard 2, as the electronic whiteboard 2 is an email sender. That is, the email sender is not a user operating the electronic whiteboard 2, but is previously set as the electronic whiteboard 2. The authentication requirement field 286 is a field to be set with information indicating whether or not to request the mail server 7 to authenticate the email sender. The account field 285 and the password field 286 are entered with account information, which is to be used by the mail server 7 to authenticate the electronic whiteboard two using Send Mail Transfer Protocol (SMTP).

In response to pressing of the "QR code" button 239 by the user, the electronic whiteboard 2 controls the display 220 to display a QR code display screen 290 as illustrated in FIG. 10C. The QR code display screen 290 displays a QR code 291 embedded with the device ID for identifying the electronic whiteboard 2 (the own device). For example, the user activates a QR code reader application installed on such as the smart phone, to cause the activated reader application to read the QR code 291 to obtain the device ID. The QR code display screen 290 further includes an "End" button 297, which switches back from the QR code display screen 290 to the drawing image screen 230. For each of the screens illustrated in FIGS. 10A and 10B, "Cancel" buttons 279 and 289 are displayed to return to the drawing image screen 230 illustrated in FIG. 8A.

Figure 8C:
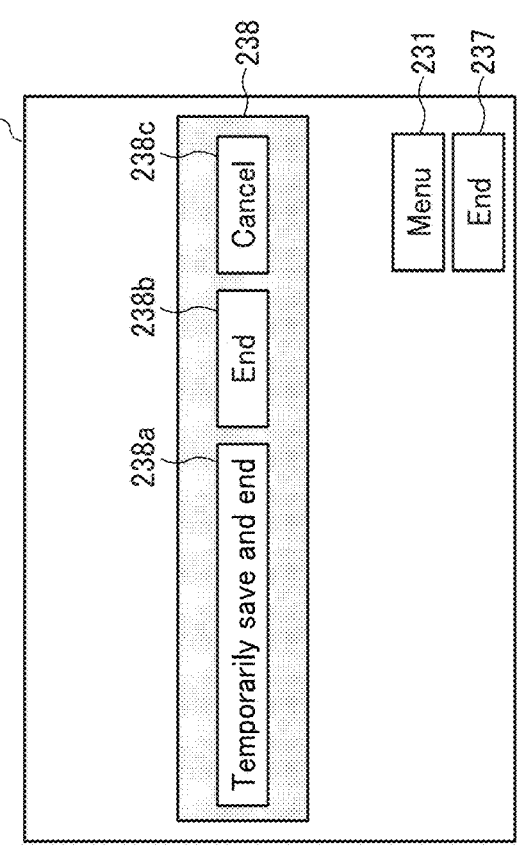

Referring back to FIG. 8A, in response to pressing of the "End" key 237 with such as the electronic pen 2500 by the user, the electronic whiteboard 2 displays an end confirmation window 238 on the drawing image screen 230 as illustrated in FIG. 8C.

The end confirmation screen 238 of FIG. 8C includes a "Temporarily save and end" button 238a, an "End" button 238b, and a "Cancel" button 238c.

The "Temporarily save and end" button 238a is a graphical image which, when selected, temporarily saves the drawing image drawn to the drawing image screen 230, logs out the user, and ends display operation. The "End" button 238b is a graphical image which, when selected, logs out the user and ends display operation. That is, when the user has logged in, the drawing image screen, which has been drawn before logging out, is not displayed. The "Cancel" button 238c is a graphical image, when selected, stops displaying the end confirmation window 238, and returns to display the drawing image screen 230 as illustrated in FIG. 8A.

Any one of the IDs described above is an example of identification information identifying the device or terminal, or the user operating the device or terminal. In alternative to the device ID or terminal ID for identifying a specific device, a manufacturing number may be used as identification information for identifying the device or terminal. In alternative to the user name identifying a specific user, any user name capable of identifying the user such as a user's nickname may be registered.

Further, any one of the above-described control programs may be recorded in a file in a format installable or executable on a computer-readable recording medium for distribution. Examples of the recording medium include, but not limited to, a compact disc-recordable (CD-R), digital versatile disc (DVD), blue-ray disc, and SD card. In addition, such recording medium may be provided in the form of a program product to users within a certain country or outside that country.

The servers 5, 6, 7, and 8 may be configured as a single computer or a plurality of computers to which divided portions (functions or storages) are arbitrarily allocated.

<Functional Configuration of Communication System>

Figure 11A:
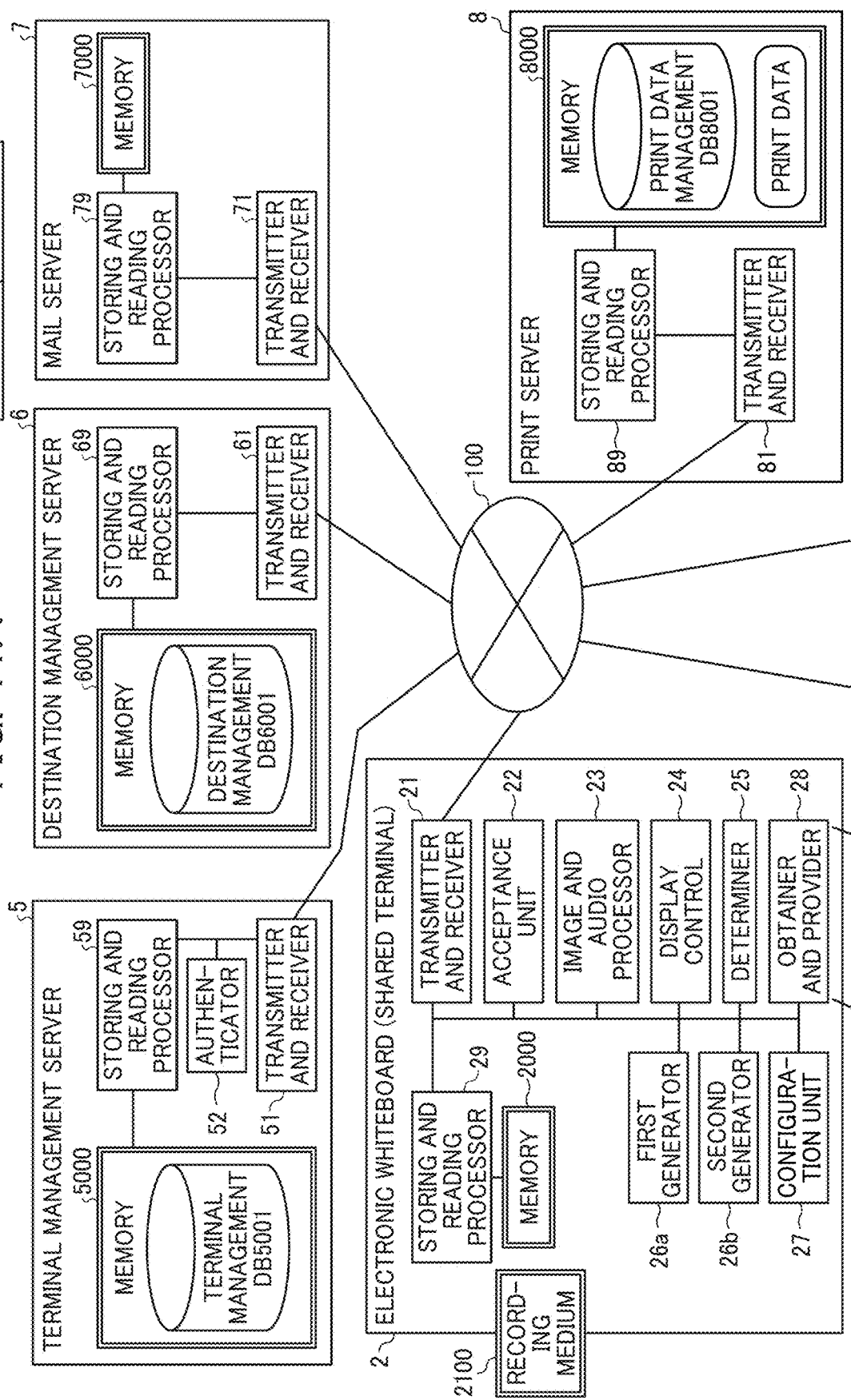
FIGS. 11A and 11B (FIG. 11) are a schematic diagram illustrating a functional configuration of the communication system, according to an embodiment.
Figure 11B:
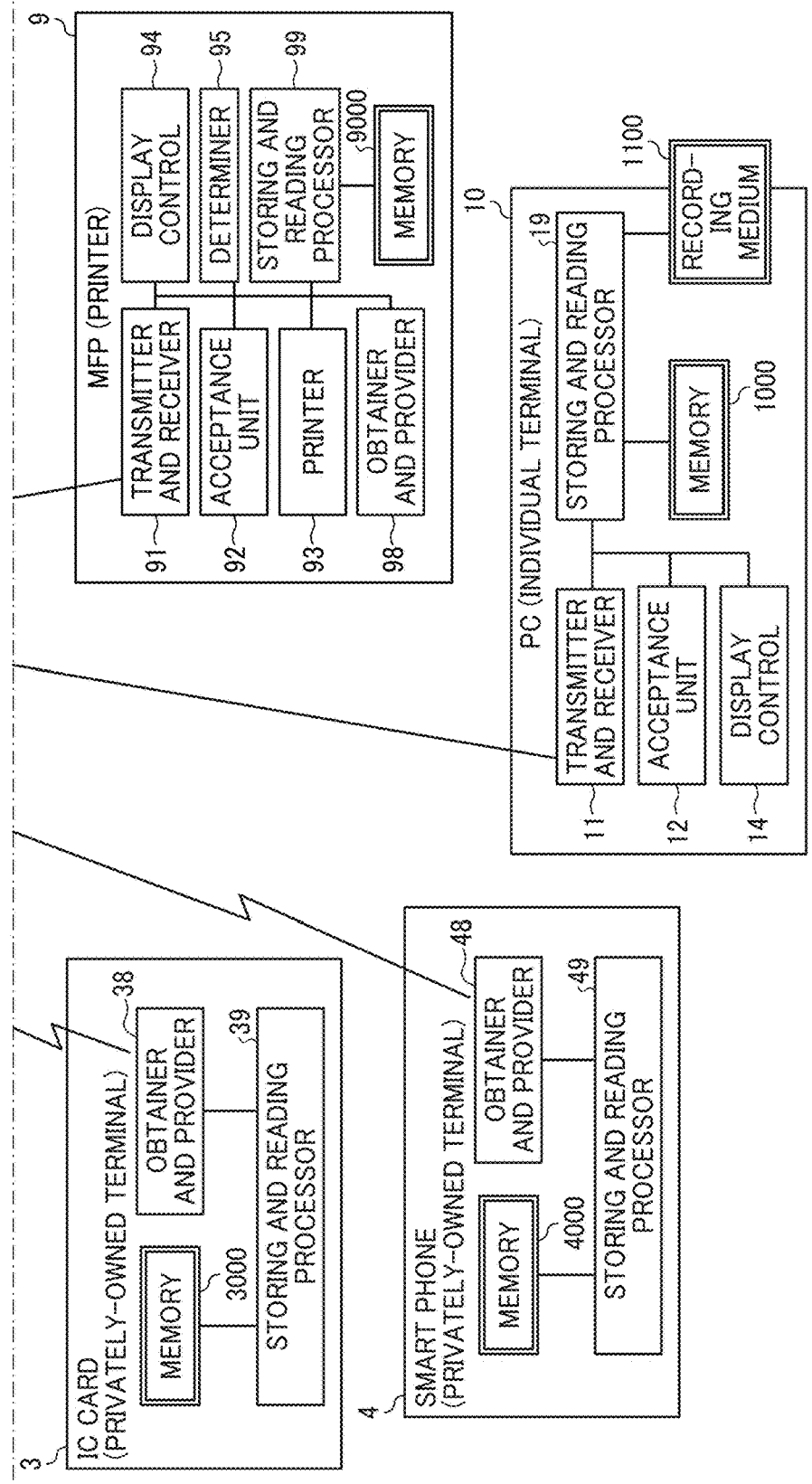

Referring to FIGS. 11 and 12, a functional configuration of the communication system 1 is described according to the embodiment. FIG. 11 is a diagram illustrating a functional configuration of the communication system 1. In FIG. 11, only a part of those terminals, devices, and servers illustrated in FIG. 1 is illustrated, which relates to processing or operation of printing drawing image data, as described below. In other words, the electronic whiteboard 2y and videoconference terminal 13 do not have to be provided. Since the IC card 3 and the smart phone 4 both have the same function of providing the terminal ID identifying the own device, to the electronic whiteboard 2, the example case of using the IC card 3 is described in the following embodiment referring to FIG. 11.

<Functional Configuration of Electronic Whiteboard>

As illustrated in FIG. 11, the electronic whiteboard 2 includes a transmitter and receiver 21, an acceptance unit 22, an image and audio processor 23, a display control 24, a determiner 25, a first generator 26a, a second generator 26b, a configuration unit 27, an obtainer and provider 28, and a storing and reading processor 29. These units are functions that are implemented by or that are caused to function by operating any of the elements illustrated in FIG. 2 in cooperation with the instructions of the CPU 201 according to the electronic whiteboard control program expanded from the SSD 204 to the RAM 203. The electronic whiteboard 2 further includes a memory 2000, which is implemented by the RAM 203 and SSD 204 illustrated in FIG. 2.

(Each Functional Unit of Electronic Whiteboard)

Next, each functional unit of the electronic whiteboard 2 is described according to the embodiment. The transmitter and receiver 21, which may be implemented by the instructions of the CPU 201, the network I/F 205, and the external device connection I/F 206, illustrated in FIG. 2, transmits or receives various data (or information) to or from other terminal, apparatus, or system through the communication network 100.

The acceptance unit 22, which is implemented by the instructions of the CPU 201, the contact sensor 215, and the electronic pen controller 216, illustrated in FIG. 2, accepts various inputs from the user.

The image and audio processor 23 is implemented by the instructions of the CPU 201, illustrated in FIG. 2. The image and audio processor 23 applies image processing to an image of a subject that has been captured by the camera 2400. After the audio of the user is converted to an audio signal by the microphone 2200, the image and audio processor 23 applies processing to audio data based on this audio signal. The image and audio processor 23 outputs the audio signal according to the audio data to the speaker 2300, and the speaker 2300 outputs audio. The image and audio processor 23 obtains drawing image data, drawn by the user with the electronic pen 2500 or the user's hand H onto the display 220, and converts the drawing image data to coordinate data. For example, when the electronic whiteboard 2x transmits the coordinate data to the whiteboard 2y at another site, the electronic whiteboard 2y controls the display 220 to display a drawing image having the same content based on the received coordinate data.

The display control 24, which is implemented by the instructions of the CPU 201 illustrated in FIG. 2 and by the display controller 213 illustrated in FIG. 2, controls the display 220 to display a drawing image.

The determiner 25, which is implemented by the instructions of the CPU 201 illustrated in FIG. 2, determines whether the electronic whiteboard 2 has received any terminal ID, for example, from the IC card 3 or the smart phone 4.

The first generator 26a, which is implemented by the instructions of the CPU 201 illustrated in FIG. 2, generates image data in such as PRCS, from the drawing image data in bitmap that has been generated based on drawing by the user. The image data may be generated not only in PRCS, but in any other desired format such as a printer control language (PCL), page description language (PDL), or Post Script (PS). The second generator 26b, which is implemented by the instructions of the CPU 201 illustrated in FIG.

2, generates image data in PDF, from the drawing image data in bitmap that has been generated based on drawing by the user.

The configuration unit 27, which may be implemented by instructions of the CPU 201 (FIG. 2), configures various settings such as a transmission source or a transmission destination of email, or a print requester name of print data.

The obtainer and provider 28, which is implemented by the instructions of the CPU 201 and the near-distance communication circuit 219 with the antenna 219a, illustrated in FIG. 2, communicates with the IC card 3 or the smart phone 4 to obtain or provide data from or to the IC card 3 or the smart phone 4 by near-distance communication.

The storing and reading processor 29, which is implemented by the instructions of the CPU 201 and the SSD 204 illustrated in FIG. 2, performs processing to store various types of data in the memory 2000 or the recording medium 2100 or to read various types of data stored in the memory 2000 or the recording medium 2100. Further, every time image data and audio data are received in performing communication with other electronic whiteboard or videoconference terminal, the memory 2000 overwrites the image data and audio data. The display 220 displays an image based on image data before being overwritten, and the speaker 2300 outputs audio based on audio data before being overwritten. The recording medium 2100 is implemented by the USB memory 2600 illustrated in FIG. 2.

<Functional Configuration of IC Card>

As illustrated in FIG. 11, the IC card 3 includes an obtainer and provider 38, and a storing and reading processor 39. These units are functions that are implemented by or that are caused to function by operating any of the elements illustrated in FIG. 3 in cooperation with the instructions of the CPU 311 according to the IC card control program expanded from the EEPROM 314 to the RAM 313. The IC card 3 further includes a memory 3000, which is implemented by the RAM 313 and the EEPROM 314 illustrated in FIG. 3.

(Each Functional Unit of IC Card)

Next, each functional unit of the IC card 3 is described according to the embodiment. The obtainer/provider 38, which is implemented by the instructions of the CPU 311 and the antenna coil 330 illustrated in FIG. 3, communicates with the electronic whiteboard 2 to obtain or provide data from or to the electronic whiteboard 2 by near-distance communication.

The storing and reading processor 39, which is implemented by the instructions of the CPU 311 illustrated in FIG. 3, performs processing to store various types of data in the memory 3000 or read various types of data stored in the memory 3000. The memory 3000 stores a terminal ID for identifying the IC card 3 as one example of privately-owned terminal.

<Functional Configuration of Smart Phone>

As illustrated in FIG. 11, the smart phone 4 includes an obtainer and provider 48, and a storing and reading processor 49. These units are functions that are implemented by or that are caused to function by operating any of the elements illustrated in FIG. 4 in cooperation with the instructions of the CPU 401 according to the control program expanded from the EEPROM 404 to the RAM 403. The smart phone 4 further includes a memory 4000, which is implemented by the RAM 403 and the EEPROM 404 illustrated in FIG. 4.

(Each Functional Unit of Smart Phone)

Next, each functional unit of the smart phone 4 is described in detail according to the embodiment. The obtainer/provider 48, which is implemented by the instructions of the CPU 401, the near-distance communication circuit 419, and the antenna 419a, illustrated in FIG. 4, communicates with the electronic whiteboard 2 to obtain or provide data from or to the electronic whiteboard 2 by near-distance communication.

The storing and reading processor 49, which is implemented by the instructions of the CPU 401 illustrated in FIG. 4, performs processing to store various types of data in the memory 4000 or read various types of data stored in the memory 4000. The memory 4000 stores a terminal ID for identifying the smart phone 4 as one example of privately-owned terminal.

<Functional Configuration of Terminal Management Server>

The terminal management server 5 includes a transmitter and receiver 51, an authenticator 52, and a storing and reading processor 59. These units are functions that are implemented by or that are caused to function by operating any of the elements illustrated in FIG. 5 in cooperation with the instructions of the CPU 501 according to the terminal control program expanded from the HD 504 to the RAM 503. The terminal management server 5 includes a memory 5000 implemented by the HD 504 illustrated in FIG. 5.

(Terminal Management Table)

FIG. 12A is a conceptual diagram illustrating a terminal management table according to the embodiment. The memory 5000 stores a terminal management DB 5001, which is implemented by the terminal management table illustrated in FIG. 12A. The terminal management table illustrated in FIG. 12A stores, for each one of a plurality of privately-owned terminals (IC card 3, smart phone 4) registered to the terminal management server 5, a user ID and a user name each identifying a user who owns the privately-owned terminal in association with the terminal ID identifying the privately-owned terminal.

(Each Functional Unit of Destination Management Server)

Next, each functional unit of the terminal management server 5 is described in detail according to the embodiment. In the following description of the functional configuration of the terminal management server 5, relationships of one or more hardware elements in FIG. 5 with each functional unit of the terminal management server 5 in FIG. 11 will also be described.

The transmitter and receiver 51 of the terminal management server 5 illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The authenticator 52, which is implemented by the instructions of the CPU 501 illustrated in FIG. 5, determines whether a terminal ID transmitted from the electronic whiteboard 2 is a privately-owned terminal (IC card 3, smart phone 4) owned by the authorized user, which is previously registered.

The storing and reading processor 59, which is implemented by the instructions of the CPU 501 illustrated in FIG. 5 and the HDD 505 illustrated in FIG. 5, performs processing to store various types of data in the memory 5000 or read various types of data stored in the memory 5000.

<Functional Configuration of Destination Management Server>

The destination management server 6 includes a transmitter and receiver 61, and a storing and reading processor

69. These units are functions that are implemented by or that are caused to function by operating any of the elements illustrated in FIG. 5 in cooperation with the instructions of the CPU 501 according to the destination management program expanded from the HD 504 to the RAM 503. The destination management server 6 includes a memory 6000 implemented by the HD 504 illustrated in FIG. 5.

(Destination Management Table)

FIG. 12B is a conceptual diagram illustrating a destination management table according to an embodiment. The memory 6000 stores a destination management DB 6001 implemented by the destination management table illustrated in FIG. 12B. The destination management table stores, for each of one or more registered users being managed by the destination management server 6, a user ID identifying the user and an email address of the user, in association with each other.

(Each Functional Unit of Destination Management Server)

Next, each functional unit of the destination management server 6 is described in detail according to the embodiment. In the following description of the functional configuration of the destination management server 6, relationships of the hardware elements in FIG. 5 with each functional unit of the destination management server 6 in FIG. 11 will also be described.

The transmitter and receiver 61 of the destination management server 6 illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 69, which is implemented by the instructions of the CPU 501 illustrated in FIG. 5 and the HDD 505 illustrated in FIG. 5, performs processing to store various types of data in the memory 6000 or read various types of data stored in the memory 6000.

<Functional Configuration of Mail Server>

The mail server 7 includes a transmitter and receiver 71, and a storing and reading processor 79. These units are functions that are implemented by or that are caused to function by operating any of the elements illustrated in FIG. 5 in cooperation with the instructions of the CPU 501 according to the destination management program expanded from the HD 504 to the RAM 503. The mail server 7 includes a memory 7000 implemented by the HD 504 illustrated in FIG. 5.

(Each Functional Unit of Mail Server)

Next, each functional unit of the mail server 7 is described in detail according to the embodiment. In the following description of the functional configuration of the mail server 7, relationships of the hardware elements in FIG. 5 with each functional unit of the mail server 7 in FIG. 11 will also be described.

The transmitter and receiver 71 of the mail server illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 79, which is implemented by the instructions of the CPU 501 illustrated in FIG. 5 and the HDD 505 illustrated in FIG. 5, performs processing to store various types of data in the memory 7000 or read various types of data stored in the memory 7000.

<Functional Configuration of Print Server>

The print server 8 includes a transmitter and receiver 81, and a storing and reading processor 89. These units are functions that are implemented by or that are caused to function by operating any of the elements illustrated in FIG. 5 in cooperation with the instructions of the CPU 501 according to the print control program expanded from the HD 504 to the RAM 503. The print server 8 includes a memory 8000 implemented by the HD 504 illustrated in FIG. 5. The memory 8000 stores therein data relating to the image, transmitted from the electronic whiteboard 2, such as the print data (Print Data Management Table)

FIG. 12C is a conceptual diagram illustrating a print data management table, according to the embodiment. The memory 8000 stores a print data management DB 8001 implemented by the print data management table illustrated in FIG. 12C. The print data management table illustrated in FIG. 12B stores, for each one of a plurality of print jobs, a user name identifying a user who requests for printing, a file name of data to be printed ("print data") such as image data to be printed, and a print configuration parameter to be used for printing such data, in association with one another.

(Each Functional Unit of Print Server)

Next, each functional unit of the print server 8 is described in detail according to the embodiment. In the following description of the functional configuration of the print server 8, relationships of one or more hardware elements in FIG. 5 with each functional unit of the print server 8 in FIG. 11 will also be described.

The transmitter and receiver 81 of the print server 8 illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 89, which is implemented by the instructions of the CPU 501 illustrated in FIG. 5 and the HDD 505 illustrated in FIG. 5, performs processing to store various types of data in the memory 8000 or read various types of data stored in the memory 8000.

<Functional Configuration of MFP>

As illustrated in FIG. 11, the MFP 9 includes a transmitter and receiver 91, an acceptance unit 92, a printer 93, a display control 94, a determiner 95, an obtainer and provider 98, and a storing and reading processor 99. These units are functions that are implemented by or that are caused to function by operating any of the hardware elements illustrated in FIG. 6 in cooperation with the instructions of the CPU 901 according to the printer control program expanded onto the RAM 902b. The MFP 9 further includes a memory 9000 implemented by the HD 909 illustrated in FIG. 6.

(Each Functional Unit of MFP)

In the following description of the functional configuration of the MFP 9, relationships of the elements in FIG. 6 with the functional configuration of the MFP 9 in FIG. 11 will also be described.

The transmitter/receiver 91 of the MFP 9 illustrated in FIG. 11, which is implemented by the instructions of the CPU 901 illustrated in FIG. 6 and by the network I/F 950 illustrated in FIG. 6, transmits or receives various types of data (or information) to or from another terminal, device, or system via the communication network 100.

The acceptance unit 92, which is implemented by the instructions of the CPU 901 and the control panel 940 illustrated in FIG. 6, accepts various inputs from the user.

The printer 93, which is implemented by the instructions of the CPU 901 and the printer controller 932 illustrated in FIG. 6, prints an image based on the data to be printed (print data), such as image data, using an image forming device.

The display control 94, which is implemented by the instructions of the CPU 901 and the control panel 940 illustrated in FIG. 6, displays, through the control panel 940, various print configuration parameters such as information indicating color printing or monochrome printing.

The determiner 95, which is implemented by the instructions of the CPU 901, determines whether the authentication result transmitted from the terminal management server 5 indicates that the IC card (that is, the terminal ID) is a legitimate card owned by the authorized user.

The obtainer and provider 98, which is implemented by the instructions of the CPU 901 and the near-distance communication circuit 920 with the antenna 920a, illustrated in FIG. 6, communicates with the IC card 3 or the smart phone 4 to obtain or provide data from or to the IC card 3 or the smart phone 4 by near-distance communication.

The storing and reading processor 99, which may be implemented by the instructions of the CPU 901 and the HDD 908, illustrated in FIG. 6, performs processing to store various types of data in the memory 9000 or read various types of data stored in the memory 9000.

<Functional Configuration of PC>

As illustrated in FIG. 11, the PC 10 includes a transmitter and receiver 11, an acceptance unit 12, a display control 14, and a storing and reading processor 19. These units are functions that are implemented by or that are caused to function by operating any of the elements illustrated in FIG. 5 in cooperation with the instructions of the CPU 501 according to the terminal control program expanded from the HD 504 to the RAM 503. The PC 10 further includes a memory 1000 implemented by the HD 504 illustrated in FIG. 5.

(Each Functional Unit of PC)

Next, a functional configuration of the PC 10 is described in detail. The transmitter/receiver 11 of the PC 10 illustrated in FIG. 11, which is implemented by the instructions of the CPU 501 illustrated in FIG. 5 and by the network I/F 509 illustrated in FIG. 5, transmits or receives various types of data (or information) to or from another terminal, device, or system via the communication network 100.

The acceptance unit 12, which is implemented by the instructions of the CPU 501, keyboard 511, and mouse 512, illustrated in FIG. 5, accepts various inputs from the user.

The display control 14, which is implemented by the instructions of the CPU 501 illustrated in FIG. 5, controls the display 508 to display such as a drawing image.

The storing and reading processor 19, which is implemented by the instructions of the CPU 501 and the HDD 505 illustrated in FIG. 5, performs processing to store various types of data in the memory 1000 or the recording medium 1100 or to read various types of data stored in the memory 1000 or the recording medium 1100. The recording medium 1100 is implemented by the recording medium 506 illustrated in FIG. 5.

Example Operations and Processes

In the following, operations and processes, performed by the communication system 1, are described according to embodiments of the present invention. The following describes an example case in which the user A and the user B are having a meeting in a certain meeting room using the electronic whiteboard 2x, as illustrated in FIG. 1. After login by the user A. and an image is drawn by at least one of the user A and the user B, the electronic whiteboard 2x transmits the drawing image data to at least one of the PC 10a owned by the user A and the PC 10b owned by the user B.

Figure 13:
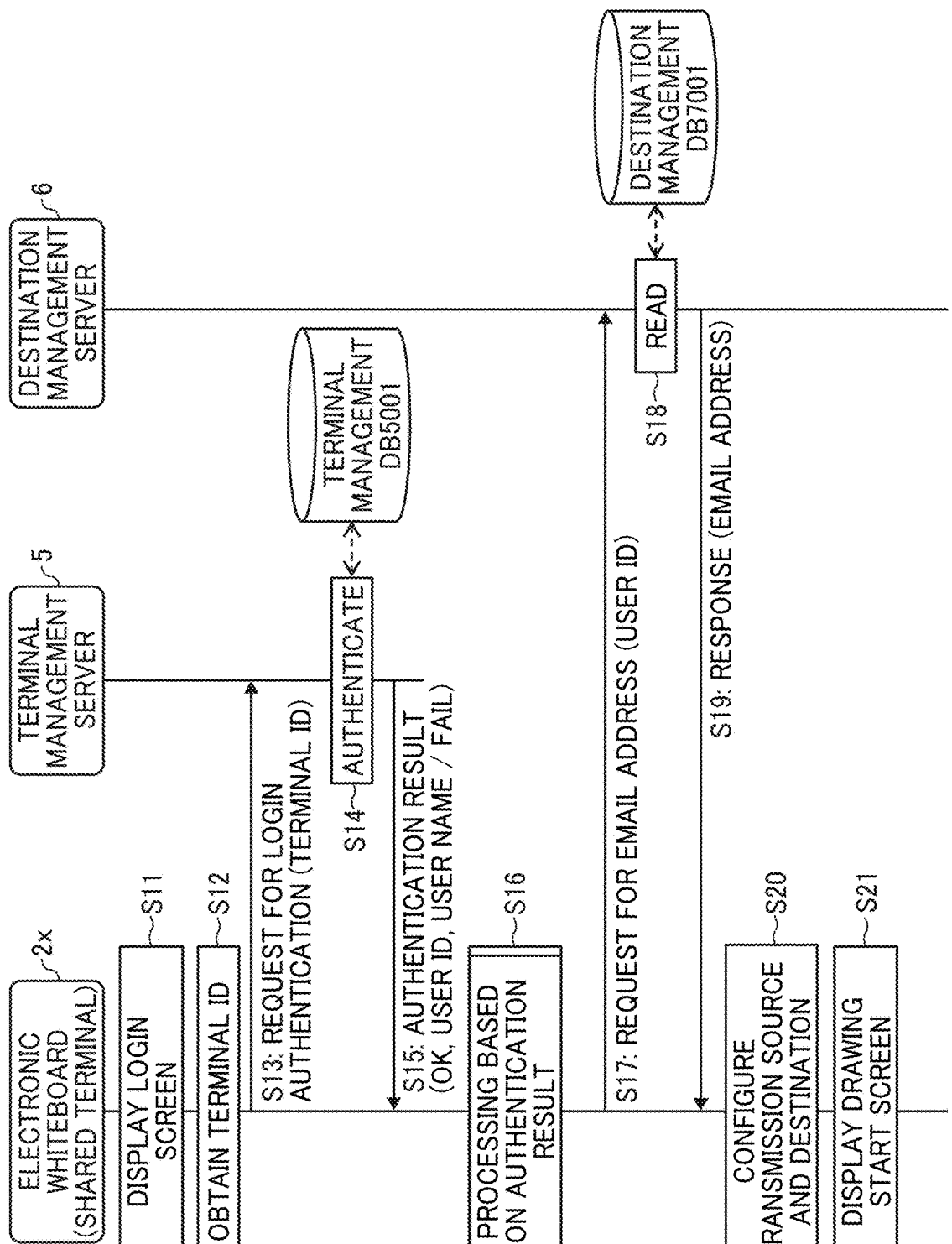
FIG. 13 is a sequence diagram illustrating operation of login processing, according to an embodiment.
Figure 14A:
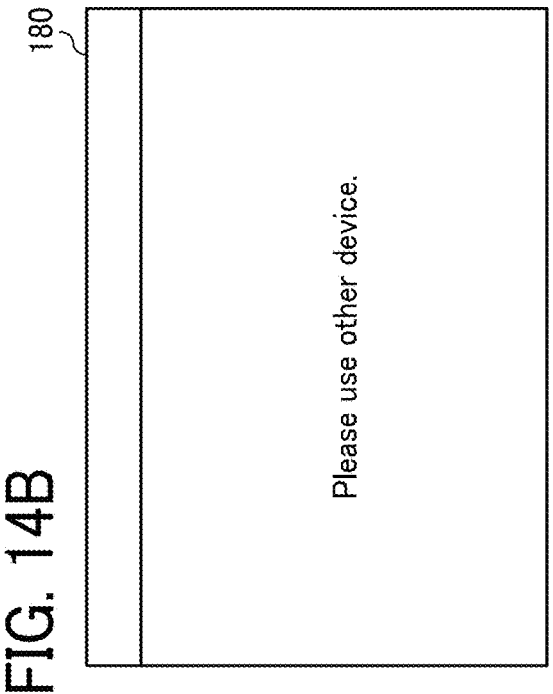
FIGS. 14A, 14B, 14C, and 14D are an illustration of example screens displayed by the display at the electronic whiteboard.
Figure 14B:
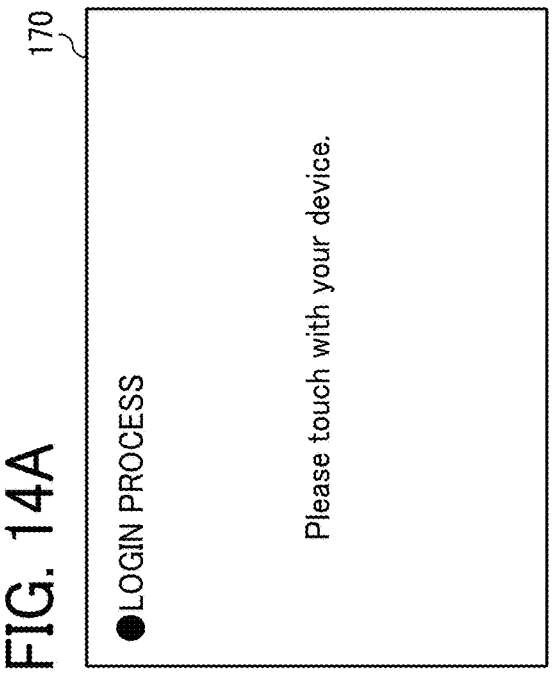
Figure 14C:
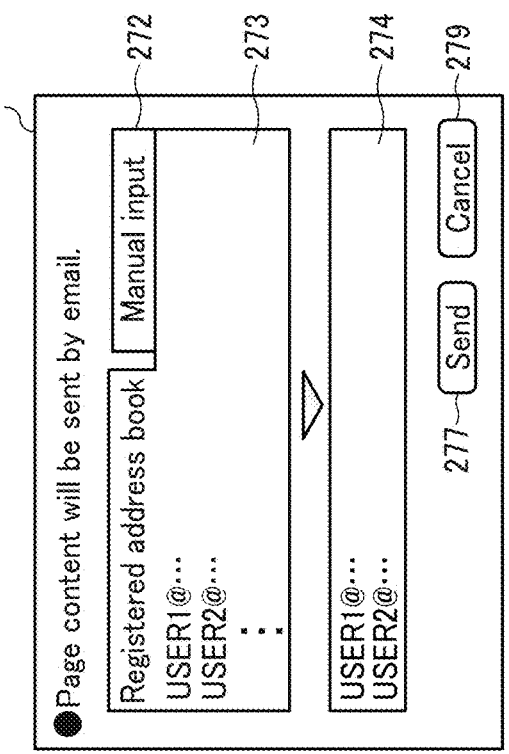
Figure 14D:
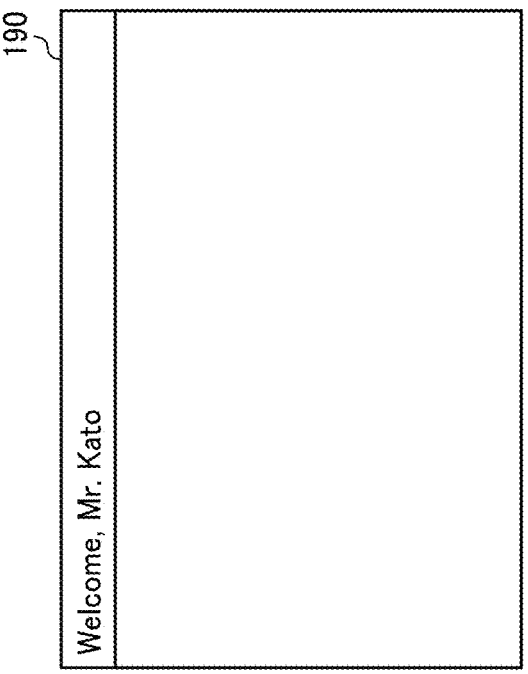
Figure 15:
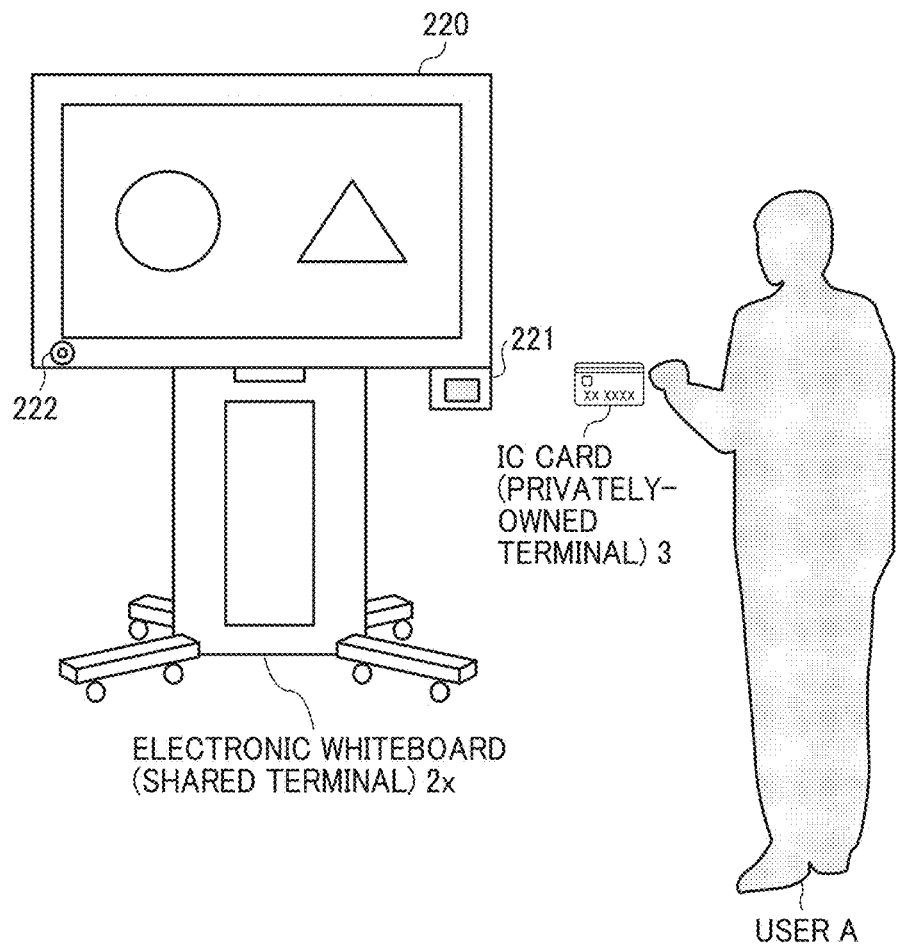
FIG. 15 is an illustration for explaining a use scenario of the electronic whiteboard, according to an embodiment.
Figure 16:
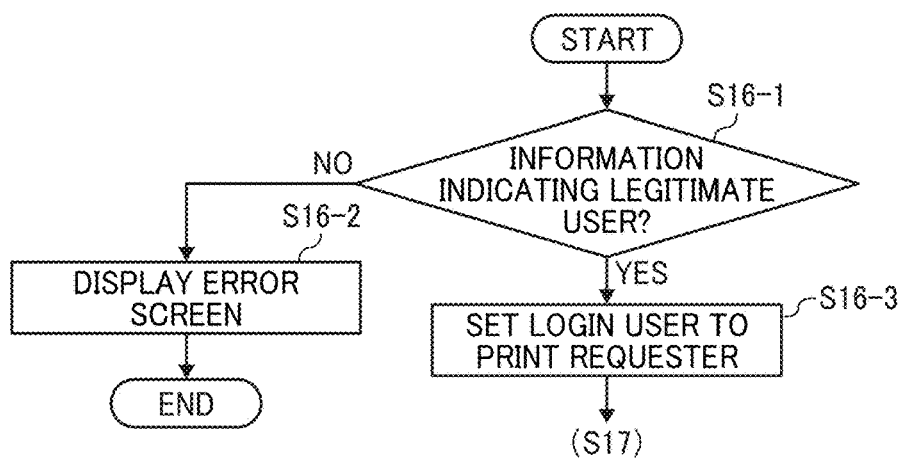
FIG. 16 is a flowchart illustrating operation of processing a login request based on an authentication result, according to the embodiment.

Referring to FIGS. 13 to 16, operation of processing a login of the user A into the electronic whiteboard 2x, is described according to an embodiment. FIG. 13 is a data sequence diagram illustrating operation of login processing, according to the embodiment. FIG. 14 is an illustration of screens displayed by the display at the electronic whiteboard 2. FIG. 15 is an illustration for explaining a use scenario of the electronic whiteboard 2, according to the embodiment. FIG. 16 is a flowchart illustrating operation of processing a login request based on an authentication result.

As illustrated in FIG. 15, as the user A presses the power switch 222 on the electronic whiteboard 2x, the display control 24 displays, on the display 220, a login screen 170 as illustrated in FIG. 14A (S11). As the user A brings the IC card 3 into proximity to the near-distance communication device 221 of the electronic whiteboard 2x, the obtainer and provider 28 of the electronic whiteboard 2x obtains the terminal ID for identifying the IC card 3 (as the privately-owned terminal), from the obtainer and provider 38 of the IC card 3 (S12). The transmitter and receiver 21 of the electronic whiteboard 2x transmits a login authentication request for authenticating the IC card 3 to permit login, to the terminal management server 5 (S13). The login authentication request includes the terminal ID of the IC card 3, obtained at the obtainer and provider 28 at S12. The terminal management server 5 receives the login authentication request at the transmitter and receiver 51.

The authenticator 52 of the terminal management server 5 authenticates the IC card 3 using the terminal ID that is obtained (S14). More specifically, the storing and reading processor 59 searches the terminal management table (FIG. 12A) in the terminal management DB 5001 using the terminal ID received at S13 as a search key, to obtain the user ID associated with the terminal ID. When the user ID associated with the terminal ID is found, the authenticator 52 confirms the terminal ID of the IC card 3 to determine that the IC card 3 (terminal ID) is a legitimate IC card owned by the authorized user identified with the user ID that is found. In such case, the user name associated with the user ID is also obtained. When the user ID associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S15). When the authenticator 52 determines that the IC card 3 is a legitimate IC card, the authentication result includes information indicating that the IC card 3 is a legitimate IC card, and the user ID and the user name each identifying the user who owns the IC card 3. When the authenticator 52 determines that the IC card 3 is not a legitimate IC card, the authentication result includes information indicating that the IC card 3 is not a legitimate IC card. The transmitter and receiver 21 of the electronic whiteboard 2x receives the authentication result.

Next, the electronic whiteboard 2x performs processing based on the authentication result (S16). Referring to FIG. 16, S16 of performing processing based on the authentication result is described. FIG. 16 is a flowchart illustrating operation of processing based on the authentication result in response to a login request, according to the embodiment.

As illustrated in FIG. 16, the determiner 25 determines whether the received authentication result indicates that the IC card is owned by the legitimate user (that is, the terminal ID transmitted at S13 indicates the legitimate user) (S16-1). When the determiner 25 determines that the authentication result does not indicate that the IC card is owned by the legitimate user ("NO" at S16-1), the login fails, and the display control 24 controls the display 220 to display an error screen 180 as illustrated in FIG. 14B (S16-2). When the determiner 25 determines that the authentication result indicates that the IC card is owned by the legitimate user ("YES" at S16-1), the login succeeds, and the configuration unit 27 sets the login user (in this example, the user A) as a print requester (S16-3). The operation then proceeds to S17. The following describes the case where the authentication result includes the information indicating that the IC card 3 is a legitimate IC card.

The transmitter and receiver 21 of the electronic whiteboard 2x transmits a request for email address of the user who owns the IC card 3 (user A, in this example) to the destination management server 6 (S17). The email address request includes the user ID that is received at S15. The destination management server 6 receives the email address request at the transmitter and receiver 61.

Next, the storing and reading processor 69 of the destination management server 6 searches the destination management table (FIG. 12B) in the destination management DB 6001, using the user ID received at S17 as a search key, to obtain the email address associated with the user ID (S18). The transmitter and receiver 61 transmits a response to the email address request to the electronic whiteboard 2x (S19). The response includes an email address read at S18, which is associated with the user ID of the user who owns the IC card 3. The electronic whiteboard 2x receives the response to the email address request at the transmitter and receiver 21.

Next, the configuration unit 27 of the electronic whiteboard 2x sets a source and a destination of the email, that is, the email sender and the email destination (S20). With this configuration, when displaying the email configuration screen 280 as illustrated in FIG. 10B, the display control 24 displays, in the sender email field 283, the email address of the login user, instead of the email address assigned to the electronic whiteboard 2. Similarly, when displaying the email configuration screen 280 as illustrated in FIG. 10A, the display control 24 displays, in the address configuration field 274, the email address of the login user.

Next, the display control 24 starts to display, on the display 220, such as a ticker with the login user name, for example, the ticker "Welcome, Mr. Kato" as illustrated in FIG. 14C, for example, when displaying a screen for allowing the user to start drawing (S21). The text data "Kato" is extracted from the user name of the login user, received at S15. Through this operation, the users A and B are able to drawn an image on a screen of the electronic whiteboard 2x.

<Email Transmission>

Figure 17:
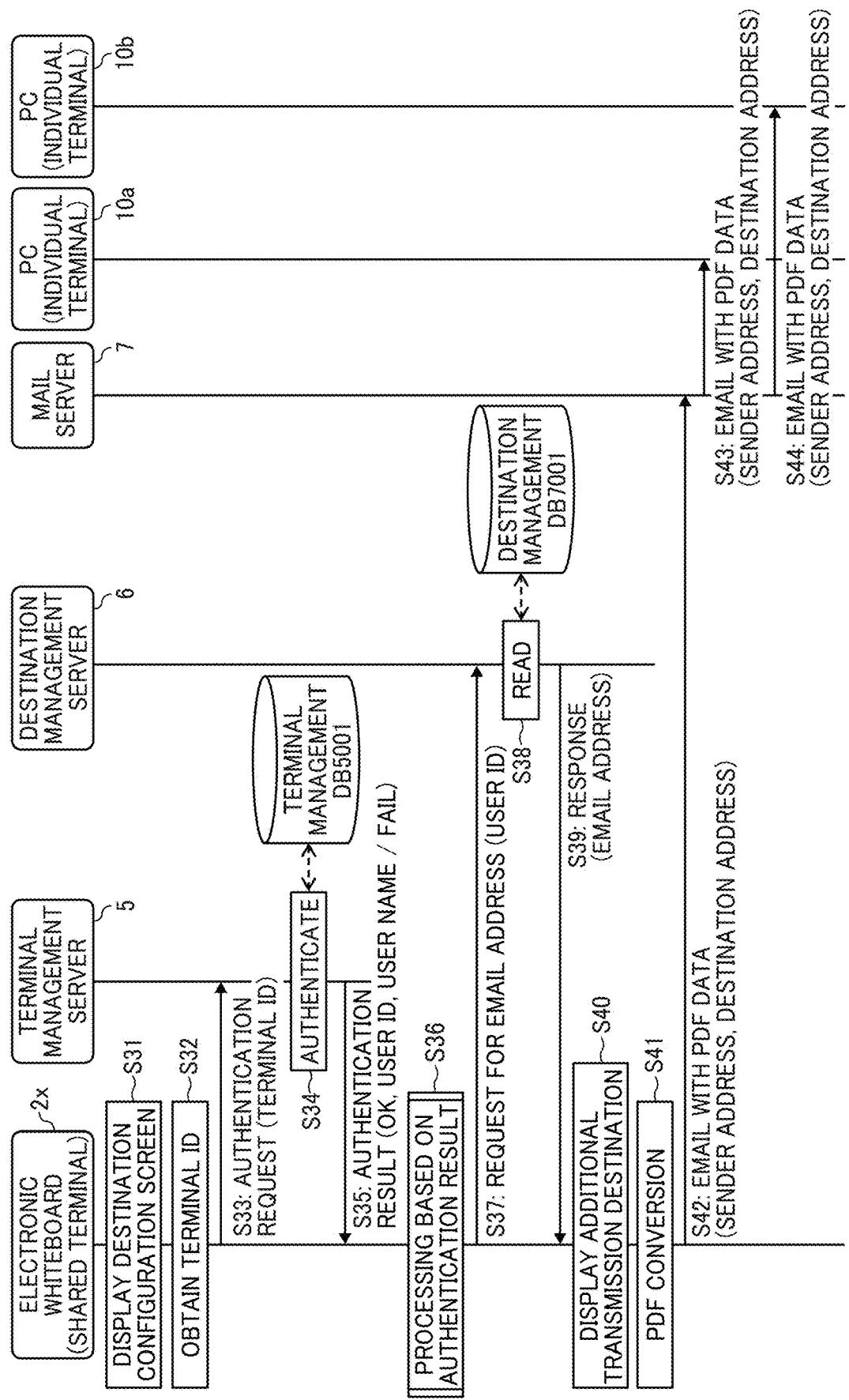
FIG. 17 is a sequence diagram illustrating operation of processing email transmission with drawing image data, according to an embodiment.
Figure 18:
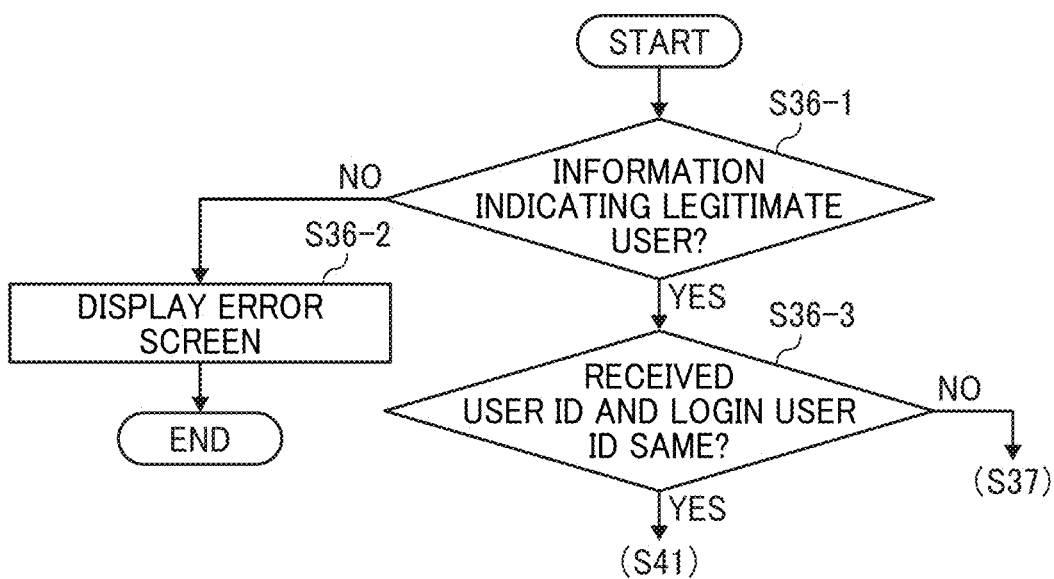
FIG. 18 is a flowchart illustrating operation of processing email transmission based on an authentication result, according to the embodiment.

Referring to FIGS. 17 and 18, operation of transmitting an email attached with the drawing image data respectively to the PC 10a and PC 10b, performed by the electronic whiteboard 2x, is described according to an embodiment. FIG. 17 is a data sequence diagram illustrating operation of processing email transmission with the drawing image data, according to the embodiment. FIG. 18 is a flowchart illustrating operation of processing email transmission based on the authentication result, in email transmission, according to the embodiment.

During a meeting, the users A and B draw images on the electronic whiteboard 2x. In the middle or end of the meeting, the user A presses the "Menu" button 231 illustrated in FIG. 8A with such as the electronic pen 2500, and further presses the "Email" button 237 as illustrated in FIG. 8B. The display control 24 then displays, on the display 220, the destination configuration screen 270 as illustrated in FIG. 10A (S31). The destination configuration screen 270 displays, in the address configuration field 274, the email address of the login user A. Alternatively, after instructing to display the destination configuration screen 270 as illustrated in FIG. 10A, the user A may select the "Manual input" tab 272 to manually enter the email address of the user A with such as the electronic pen 2500.

In case the email address of the user B, who has not logged in, is to be included as a destination of the email, the user B brings the smart phone 4 into proximity to the near-distance communication device 221 of the electronic whiteboard 2x. The obtainer and provider 28 of the electronic whiteboard 2x obtains the terminal ID identifying the smart phone 4 (as the privately-owned terminal) from the obtainer and provider 48 of the smart phone 4 (S32).

The transmitter and receiver 21 of the electronic whiteboard 2x transmits an authentication request for authenticating the smart phone 4 to the terminal management server 5 (S33). The authentication request includes the terminal ID of the smart phone 4, obtained at the obtainer and provider 28. The terminal management server 5 receives the authentication request at the transmitter and receiver 51.

The authenticator 52 of the terminal management server 5 authenticates the smart phone 4 using the terminal ID that is obtained (S34). More specifically, the storing and reading processor 59 searches the terminal management table (FIG. 12A) in the terminal management DB 5001 using the terminal ID received at S33 as a search key, to obtain the user ID associated with the terminal ID. When the user ID associated with the terminal ID is found, the authenticator 52 confirms the terminal ID of the smart phone 4 to determine that the smart phone 4 (terminal ID) is a legitimate terminal owned by the authorized user identified with the user ID that is found. In such case, the user name associated with the user ID is also obtained. When the user ID associated with the terminal ID is not found, the authenticator 52 determines that the smart phone 4 (terminal ID) is not a legitimate terminal owned by the authorized user.

Next, the transmitter and receiver 51 of the terminal management server 5 transmits an authentication result to the electronic whiteboard 2x (S35). When the authenticator 52 determines that the smart phone 4 is a legitimate terminal, the authentication result includes information indicating that the smart phone 4 is a legitimate terminal and the user ID and the user name each identifying the user who owns the smart phone 4. When the authenticator 52 determines that the smart phone 4 is not a legitimate terminal, the authentication result includes information indicating that the smart phone 4 is not a legitimate terminal. The transmitter and receiver 21 of the electronic whiteboard 2x receives the authentication result.

Next, the electronic whiteboard 2x performs processing based on the authentication result (S36). Referring to FIG. 18, S36 of performing processing based on the authentication result is described. FIG. 18 is a flowchart illustrating operation of processing based on the authentication result, in email transmission, according to the embodiment.

As illustrated in FIG. 18, the determiner 25 determines whether the received authentication result indicates that the smart phone 4 is owned by the legitimate user (that is, the terminal ID transmitted at S33 indicates the legitimate user) (S36-1). When the determiner 25 determines that the authentication result does not indicate that the smart phone 4 is owned by the legitimate user ("NO" at S36-1), the login fails, and the display control 24 controls the display 220 to display the error screen 180 as illustrated in FIG. 14B (S36-2). When the determiner 25 determines that the authentication result indicates that the smart phone 4 is owned by the legitimate user ("YES" at S36-1), the determiner 25 further determines whether the user ID received at S35 is the same as the user ID of the login user (in this example, the user A) (S36-3). When the determiner 25 determines that the received user ID is the same as the login user ID ("YES" at S36-3), the operation proceeds to S37. When the determiner 25 determines that the received user ID is not the same as the login user ID ("NO" at S36-3), the operation proceeds to S37. At S37, the transmitter and receiver 21 of the electronic whiteboard 2x transmits a request for email address to the destination management server 6 (S37). The email address request includes the user ID that is received at S35. In this example, the user ID of the user B is included. The destination management server 6 receives the email address request at the transmitter and receiver 61.

Next, the storing and reading processor 69 of the destination management server 6 searches the destination management table (FIG. 12B) in the destination management DB 6001, using the user ID received at S37 as a search key, to obtain the email address associated with the user ID (S38). The transmitter and receiver 61 transmits a response to the email address request to the electronic whiteboard 2x (S39). The response includes an email address read at S38, which is associated with the user ID of the user who owns the smart phone 4. The electronic whiteboard 2x receives the response to the email address request at the transmitter and receiver 21.

As illustrated in FIG. 14D, the display control 24 of the electronic whiteboard 2x displays, in the address configuration field 274, the email address "USER2@ . . . " of the user B in addition to the email address "USER1@ . . . " of the login user A that has been displayed.

As the acceptance unit 22 of the electronic whiteboard 2x accepts pressing of the "Send" button 277 by the user A or the user B, the second generator 26b of the electronic whiteboard 2x generates image data in PDF, from the drawing image data in bitmap that has been generated based on drawing by the user (S41). The transmitter and receiver 21 transmits an email attached with the image data generated at S41, to the mail server 7 (S42). The transmitter and receiver 71 of the mail server 7 receives the email attached with the image data in PDF. The email includes the email address of the login user A as a sender email address, and the email address of the login user A as a destination email address. In case the user B has brought the smart phone 4 into proximity to the near-distance communication device 221, the email further includes the email address of the user B as a destination email address. That is, since at S20, the transmission source is changed from the electronic whiteboard 2x to the login user A (that is, the email address of the login user A), the email will be sent from the user A to the user A. For the user B, the email will be sent from the user A to the user B. In the following, it is assumed that the email to be transmitted includes the user B as an email destination, in addition to the user A.

The transmitter and receiver 71 of the mail server 7 transmits the email, attached with the image data in PDF, to each one of the PC 10a and the PC 10b (S43, S44). The email includes the email address of the user A as a sender email address, and a destination email address that is, the email address of the user A and the email address of the user B that is received at S39, in this example. Each of the PC 10a and PC 10b receives the email attached with the image data in PDF, which is generated based on the drawing image drawn on the electronic whiteboard 2x.

<Printing of Drawing Image Data>

Referring to FIGS. 19 to 23, operation of sending drawing image data to the MFP 9 via the print server 8, performed by the electronic whiteboard 2x, and printing using the MFP 9, is described according to an embodiment. The drawing image is drawn by the user A or B.

Figure 19:
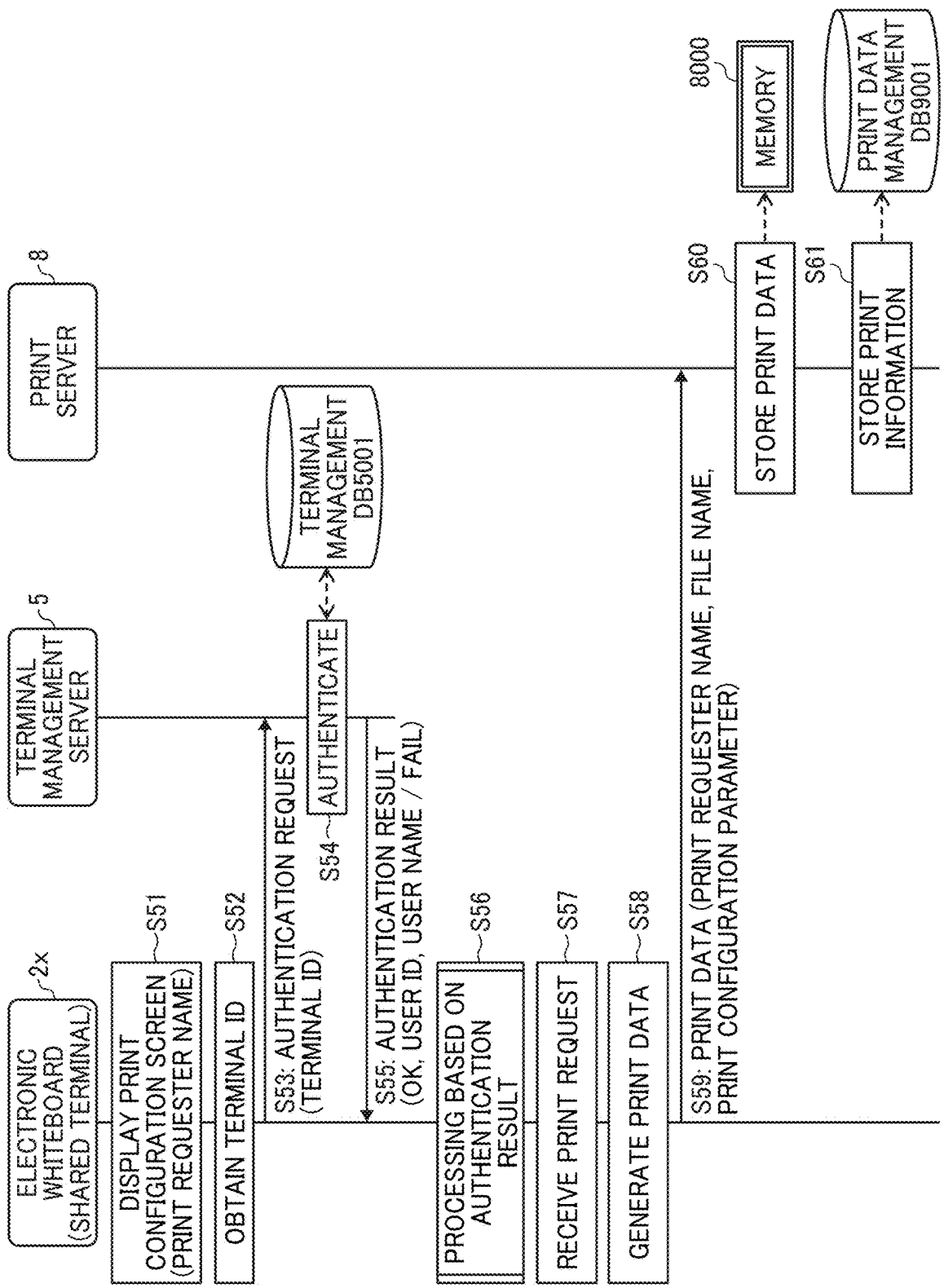
FIG. 19 is a sequence diagram illustrating operation of processing preparation for printing drawing image data, according to an embodiment.
Figure 20:
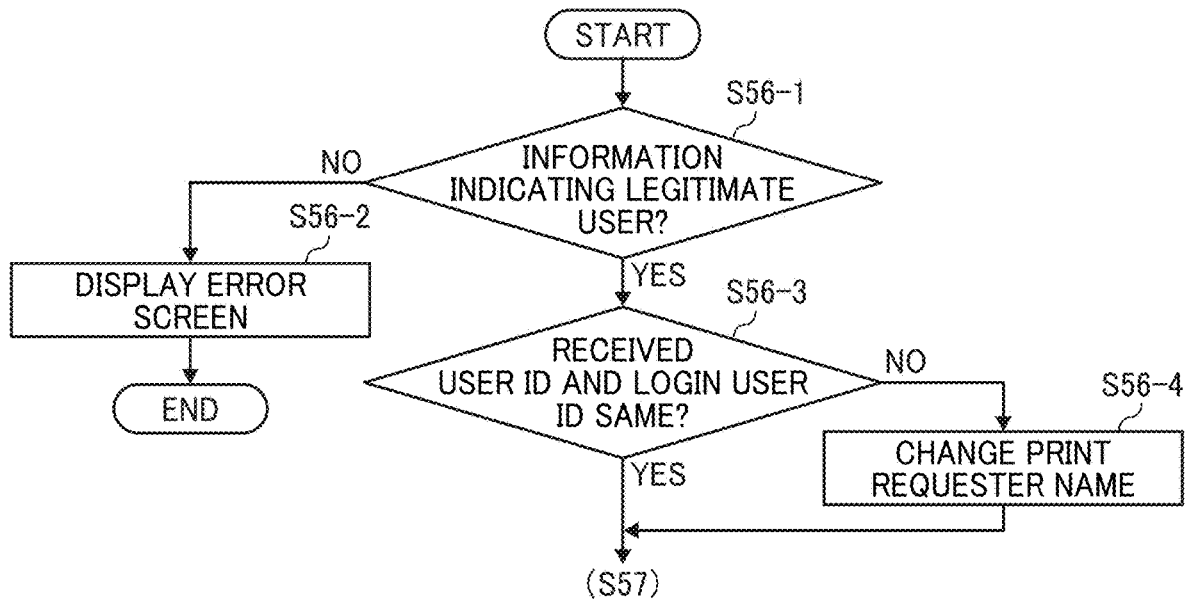
FIG. 20 is a flowchart illustrating operation of processing printing based on an authentication result, according to the embodiment.
Figure 21:
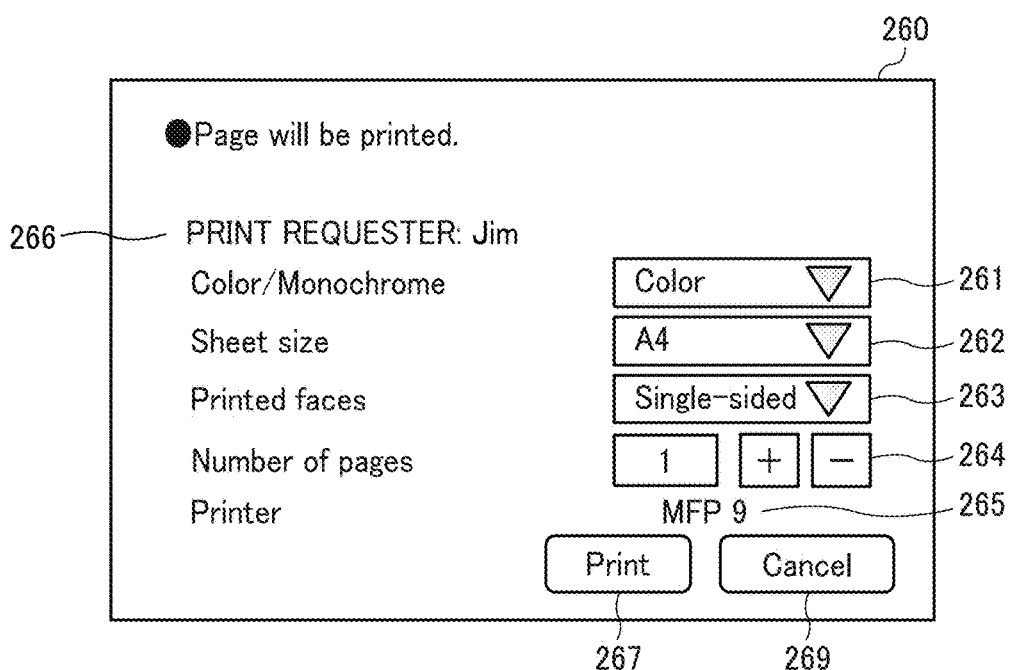
FIG. 21 is an illustration of an example print configuration screen.

FIG. 19 is a data sequence diagram illustrating operation for preparing printing of drawing image data, according to the embodiment. FIG. 20 is a flowchart illustrating operation of processing based on the authentication result in response to a print request, according to the embodiment. FIG. 21 is an illustration of an example print configuration screen.

During a meeting, the users A and B draw images on the electronic whiteboard 2x. In the middle or end of the meeting, the user A presses the "Menu" button 231 illustrated in FIG. 8A with such as the electronic pen 2500, and further presses the "Print" button 236 as illustrated in FIG. 8B. The display control 24 then displays, on the display 220, the print configuration screen 260 as illustrated in FIG. 9D (S51). The configuration unit 27 sets the user name of the login user A as a print requester. The display control 24 displays, in the print configuration screen 260, the user name of the login user A as a print requester.

As illustrated in FIG. 15, as the user A brings the IC card 3 into proximity to the near-distance communication device 221 of the electronic whiteboard 2x, the obtainer and provider 28 of the electronic whiteboard 2x obtains the terminal ID identifying the IC card 3 (as the privately-owned terminal), from the obtainer and provider 38 of the IC card 3 (S52). The transmitter and receiver 21 of the electronic whiteboard 2x transmits an authentication request for authenticating the IC card 3 to the terminal management server 5 (S53). The authentication request includes the terminal ID of the IC card 3, obtained at the obtainer and provider 28. The terminal management server 5 receives the authentication request at the transmitter and receiver 51.

The authenticator 52 of the terminal management server 5 authenticates the IC card 3 using the terminal ID that is obtained (S54). More specifically, the storing and reading processor 59 searches the terminal management table (FIG. 12A) in the terminal management DB 5001 using the terminal ID received at S53 as a search key, to obtain the user name associated with the terminal ID. When the user name associated with the terminal ID is found, the authenticator 52 confirms to determine that the IC card 3 (terminal ID) is a legitimate IC card owned by the authorized user identified with the user ID that is found. In such case, the user name associated with the user ID is obtained. When the user name associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S55). When the authenticator 52 determines that the IC card 3 is a legitimate IC card, the authentication result includes information indicating that the IC card 3 is a legitimate IC card and the user name identifying the user who owns the IC card 3. When the authenticator 52 determines that the IC card 3 is not a legitimate IC card the authentication result includes information indicating that the IC card 3 is not a legitimate IC card. The transmitter and receiver 21 of the electronic whiteboard 2x receives the authentication result.

Next, the electronic whiteboard 2x performs processing based on the authentication result (S56). Referring to FIG. 20, S56 of performing processing based on the authentication result is described. FIG. 20 is a flowchart illustrating operation of processing based on the authentication result in response to a print request, according to the embodiment.

As illustrated in FIG. 20, the determiner 25 determines whether the received authentication result includes information indicating that the IC card is owned by the legitimate user (that is, the terminal ID transmitted at S53 indicates the legitimate user) (S56-1). When the determiner 25 determines that the authentication result does not include information indicating that the IC card is owned by the legitimate user ("NO" at S56-1), the display control 24 controls the display 220 to display the error screen 180 as illustrated in FIG. 14B (S56-2). When the determiner 25 determines that the authentication result includes information indicating that the IC card is owned by the legitimate user ("YES" at S56-1), the determiner 25 further determines whether the user ID received at S55 is the same as the user ID of the login user (in this example, the user A) (S56-3). When the determiner 25 determines that the received user ID is the same as the login user ID ("YES" at S56-3), the operation proceeds to S57. When the determiner 25 determines that the received user ID is not the same as the login user ID ("NO" at S56-3), the configuration unit 27 changes the print requester name to the user name that is received at S55 (S56-4). For example, while the display control 24 is displaying the print configuration screen 260 illustrated in FIG. 9D, and the login user A brings the IC card 3 into proximity to the near-distance communication device 221, the print requester stays the same to continue displaying "Kato". In contrary, while the display control 24 is displaying the print configuration screen 260 illustrated in FIG. 9D, and the user B, not logged in, brings the smart phone 4 into proximity to the near-distance communication device 221, the print requester name is changed from "Kato" to "Jim" as illustrated in FIG. 21, based on the user name of the user B that is obtained. The operation then proceeds to S57.

Referring back to FIG. 19, from the user A via the print configuration screen of FIG. 9D or the user B via the print configuration screen of FIG. 21, the acceptance unit 22 of the electronic whiteboard 2x accepts set values of one or more print configuration parameters, with pressing of "Print" button 267 (S57). The first generator 26a generates image data in PRCS, from the drawing image data in bitmap that has been generated based on drawing by the user A or B, as print data (S58).

The transmitter and receiver 21 of the electronic whiteboard 2x transmits the print data generated at S58 to the print server 8 (S59). In addition to the print requester name, the print data includes other information regarding the print data such as a file name and print configuration parameters with the set values, for example, as attribute data. The print server 8 receives the print data at the transmitter and receiver 81.

Next, the storing and reading processor 89 of the print server 8 stores the print data received at S59, in the memory 8000 (S60). The storing and reading processor 89 further stores information regarding the print data received at S59 in the print data management table of FIG. 12C (S61). As described above, the information regarding the print data includes the print requester name, the file name of the print data, and the set values of the print configuration parameters. The operation of preparing for printing then ends.

Figure 22:
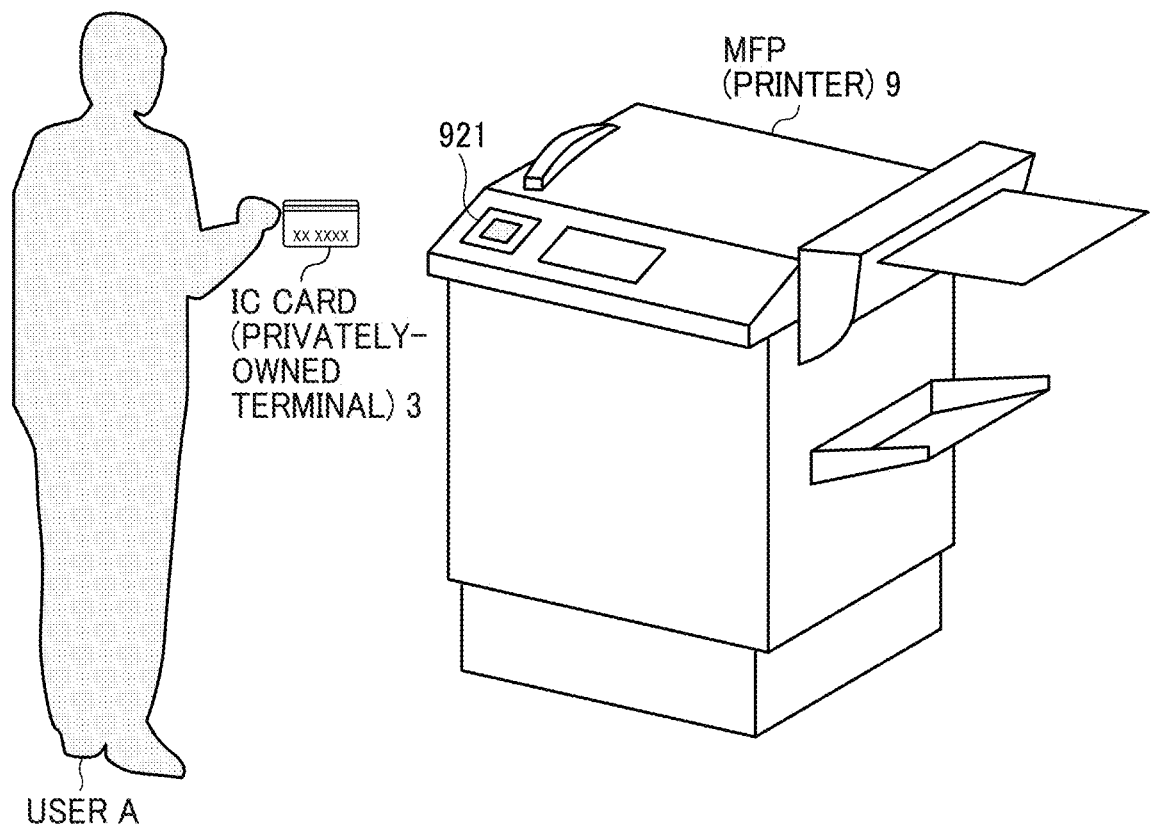
FIG. 22 is an illustration for explaining a use scenario of the MFP, according to an embodiment.
Figure 23:
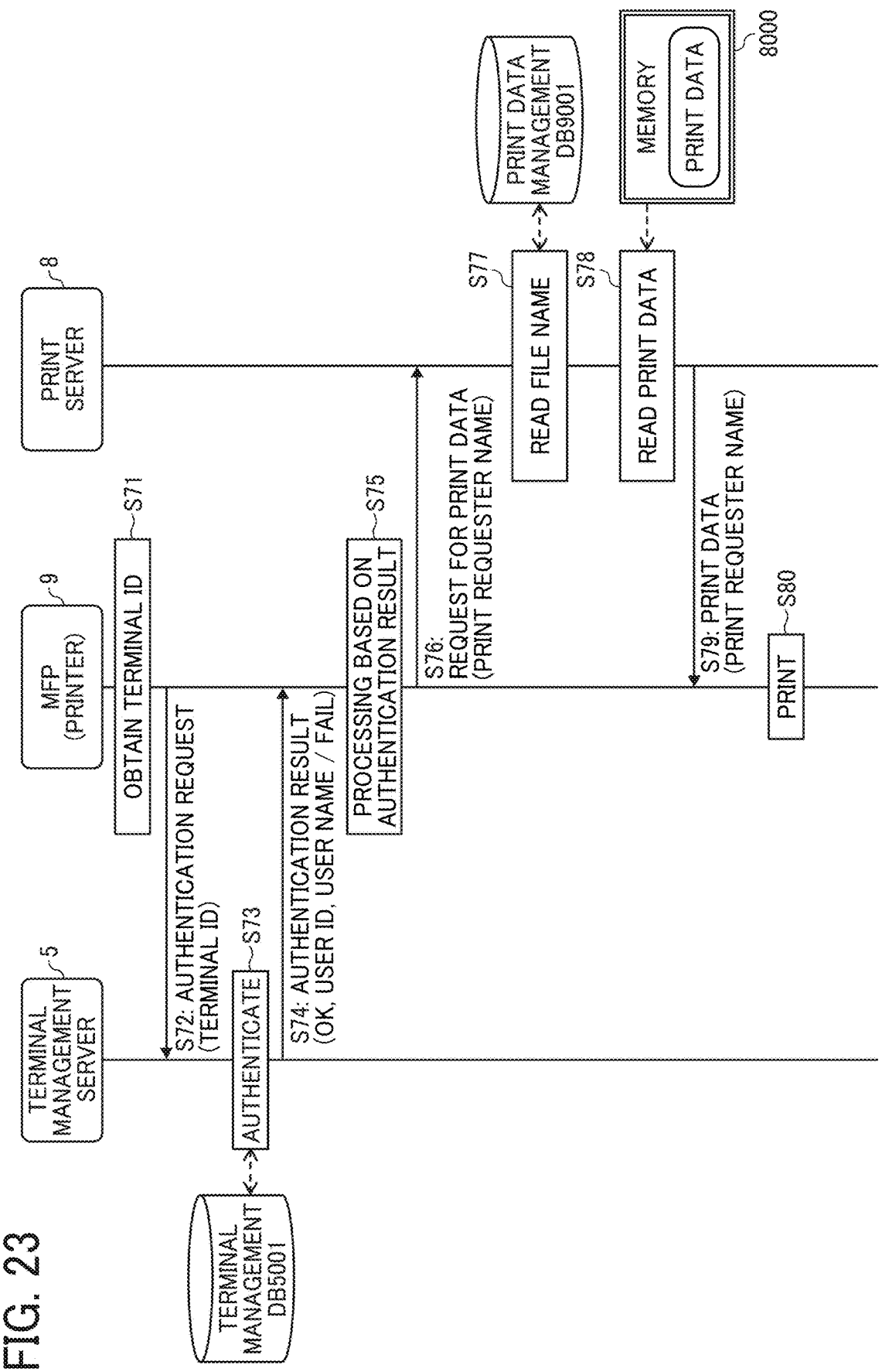
FIG. 23 is a sequence diagram illustrating operation of printing drawing image data, according to an embodiment.

Referring now to FIGS. 22 and 23, operation of printing is described according to an embodiment. FIG. 22 is an illustration for explaining a use scenario of the MFP 9, according to the embodiment. FIG. 23 is a data sequence diagram illustrating operation of printing drawing image data, according to the embodiment. In the following, it is assumed that the user A requests the electronic whiteboard 2x to perform preparation operation of FIG. 19 (S51 to S61). The near-distance communication device 921 of the MFP 9 is implemented by the near-distance communication circuit 920 and the antenna 920a, which functions as the obtainer and provider 98.

As illustrated in FIG. 22, as the user A brings the IC card 3 into proximity to the near-distance communication device 921 of the MFP 9, the obtainer and provider 98 of the MFP 9 obtains the terminal ID for identifying the IC card 3 (as the privately-owned terminal), from the obtainer and provider 38 of the IC card 3 (S71). The transmitter and receiver 91 of the MFP 9 transmits an authentication request for authenticating the IC card 3 to the terminal management server 5 (S72). The authentication request includes the terminal ID of the IC card 3, obtained at the obtainer and provider 98. The terminal management server 5 receives the authentication request at the transmitter and receiver 51.

The authenticator 52 of the terminal management server 5 authenticates the IC card 3 using the terminal ID that is obtained (S73). More specifically, the storing and reading processor 59 searches the terminal management table (FIG. 12A) in the terminal management DB 5001 using the terminal ID received at S72 as a search key, to obtain the user ID associated with the terminal ID. When the user ID associated with the terminal ID is found, the authenticator 52 confirms to determine that the IC card 3 (terminal ID) is a legitimate IC card owned by the authorized user identified with the user ID that is found. In such case, the user name associated with the user ID is obtained. When the user ID associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the MFP 9 (S74). When the authenticator 52 determines that the IC card 3 is a legitimate IC card, the authentication result includes information indicating that the IC card 3 is a legitimate IC card, and the user ID and the user name each identifying the user who owns the IC card 3. When the authenticator 52 determines that the IC card 3 is not a legitimate IC card, the authentication result includes information indicating that the IC card 3 is not a legitimate IC card. The transmitter and receiver 91 of the MFP 9 receives the authentication result.

Next, the MFP 9 performs processing based on the authentication result (S75). More specifically, the determiner 95 refers to the authentication result, to determine not to print when the authentication result indicates the illegitimate user, and determine to proceed to S76 to print when the authentication result indicates the legitimate user. The following describes the case when the authentication result includes the information indicating the legitimate user.

The transmitter/receiver 91 of the MFP 9 transmits a request for print data to the print serve 8 (S76). The print data request includes the user name that is received at S74, which is the print requester. The print server 8 receives the print data request at the transmitter/receiver 81.

Next, the storing and reading processor 89 of the print server 8 searches the print data management table (FIG. 12C) in the print data management DB 8001, using the user name received at S74 as a search key, to obtain the file name of the print data associated with the user name (S77). The storing and reading processor 89 further reads print data identified with the file name, which is read at S77, from the memory 8000 (S78). The transmitter and receiver 81 transmits the print data read at S78, to the MFP 9 (S79). The print data includes the user name that is received at S76, which is the print requester. For example, the print requester name may be associated with the print data as attribute data or included as header data. The transmitter and receiver 91 of the MFP 9 receives the print data.

The printer 93 of the MFP 9 forms an image on a recording sheet based on the print data, and outputs the printed image (S80). While the user name is transmitted as the print requester at S76 and S79, the user ID may be transmitted as information identifying the print requester, instead. In such case, the user ID is used as a search key at S77, for example. The operation of printing then ends.

<Log-Out Processing>

Figure 24:
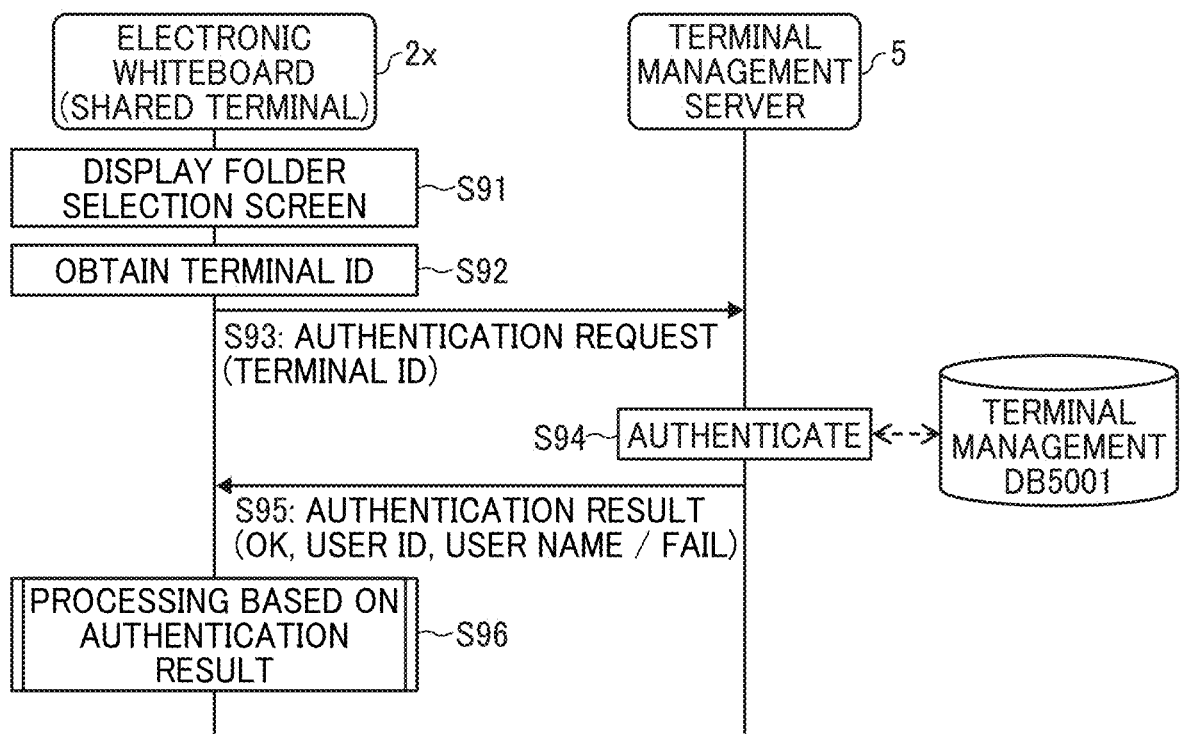
FIG. 24 is a sequence diagram illustrating operation of ending display of a drawing image, according to an embodiment.
Figure 25:
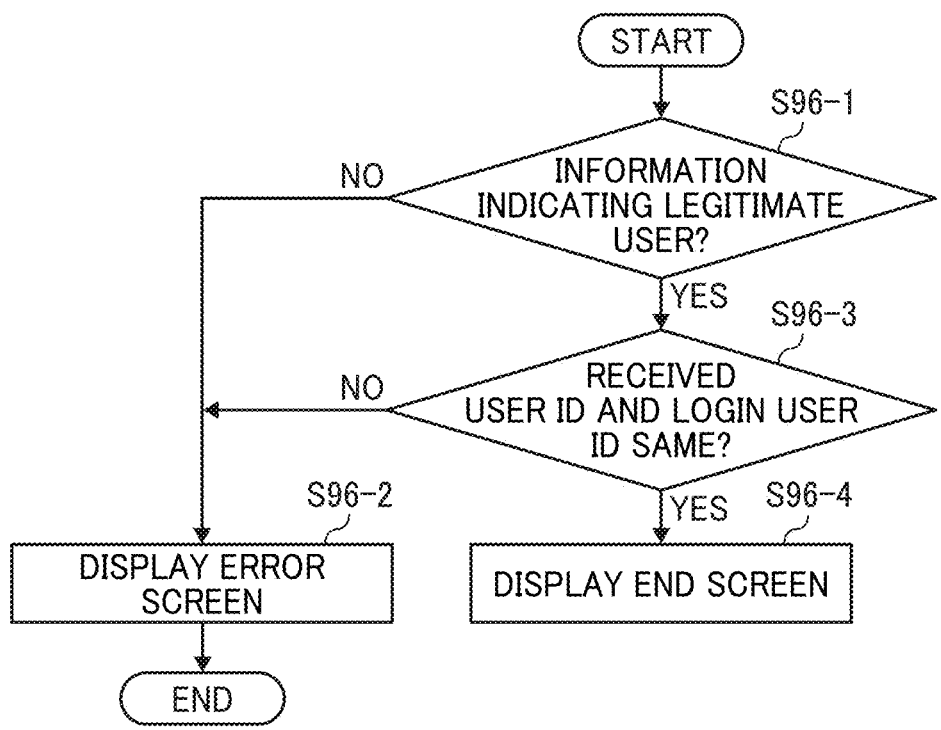
FIG. 25 is a flowchart illustrating operation of selecting a folder to store the drawing image, according to the embodiment.

Referring to FIGS. 24 and 25, operation of logging out, performed by the electronic whiteboard 2, is described according to an embodiment, as another example operation besides the above-described email transmission and printing. FIG. 24 is a data sequence diagram illustrating operation of ending display of the drawing image, according to the embodiment. FIG. 25 is a flowchart illustrating operation of selecting a folder to store the drawing image, when ending display of the drawing image, according to the embodiment. In the following, it is assumed that the user A brings his or her IC card 3 into proximity to the near-distance communication device 221 of the electronic whiteboard 2x.

During a meeting, the users A and B draw images on the electronic whiteboard 2x with such as the electronic pen 2500. In the middle or end of the meeting, the user A presses the "Menu" button 231 illustrated in FIG. 8A with such as the electronic pen 2500, and further presses the "Save" button 235 as illustrated in FIG. 8B. The display control 24 then displays, on the display 220, the folder selection screen 250 as illustrated in FIG. 9C (S91).

As the user A brings the IC card 3 into proximity to the near-distance communication device 221 of the electronic whiteboard 2x, the obtainer and provider 28 of the electronic whiteboard 2x obtains the terminal ID identifying the IC card 3 (as the privately-owned terminal), from the obtainer and provider 38 of the IC card 3 (S92).

The transmitter and receiver 21 of the electronic whiteboard 2x transmits an authentication request for authenticating the IC card 3 to the terminal management server 5 (S93). The authentication request includes the terminal ID of the IC card 3, obtained at the obtainer and provider 28. The terminal management server 5 receives the authentication request at the transmitter and receiver 51.

The authenticator 52 of the terminal management server 5 authenticates the IC card 3 using the terminal ID that is obtained (S94). More specifically, the storing and reading processor 59 searches the terminal management table (FIG. 12A) in the terminal management DB 5001 using the terminal ID received at S93 as a search key, to obtain the user ID associated with the terminal ID. When the user ID associated with the terminal ID is found, the authenticator 52 confirms the terminal ID of the IC card 3 to determine that the IC card 3 (terminal ID) is a legitimate IC card owned by the authorized user identified with the user ID that is found. In such case, the user name associated with the user ID is obtained. When the user ID associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S95). When the authenticator 52 determines that the IC card 3 is a legitimate IC card, the authentication result includes information indicating that the IC card 3 is a legitimate IC card, and the user ID and the user name each identifying the user who owns the IC card 3. When the authenticator 52 determines that the IC card 3 is not a legitimate IC card, the authentication result includes information indicating that the IC card 3 is not a legitimate IC card. The transmitter and receiver 21 of the electronic whiteboard 2x receives the authentication result.

Next, the electronic whiteboard 2x performs processing based on the authentication result (S96). Referring to FIG. 25, S96 of performing processing based on the authentication result is described.

As illustrated in FIG. 25, the determiner 25 determines whether the received authentication result includes information indicating that the IC card is owned by the legitimate user (that is, the terminal ID transmitted at S93 indicates the legitimate user) (S96-1). When the determiner 25 determines that the authentication result does not include information indicating that the IC card is owned by the legitimate user ("NO" at S96-1), the display control 24 controls the display 220 to display the error screen 180 as illustrated in FIG. 14B (S96-2). When the determiner 25 determines that the authentication result includes information indicating that the IC card is owned by the legitimate user ("YES" at S96-1), the determiner 25 further determines whether the user ID received at S95 is the same as the user ID of the login user (in this example, the user A) (S96-3). When the determiner 25 determines that the received user ID is the same as the login user ID ("YES" at S96-3), the display control 24 displays, on the display 220, the end confirmation screen 238 as illustrated in FIG. 8C (S96-4). When the determiner 25 determines that the received user ID is not the same as the login user ID ("NO" at S96-3), the operation proceeds to S96-2. At S96-2, the display control 24 displays, on the display 220, the error screen 180 as illustrated in FIG. 14B.

As described above, in response to a detection of the IC card 3, the electronic whiteboard 2 determines that an email destination is to be set when the destination configuration screen 270 of FIG. 10A is being displayed, and that printing is to be performed when the print configuration screen 260 of FIG. 9D is being displayed. In case the login user A brings the IC card 3 into proximity to the near-distance communication device 221, while other screen such as the folder selection screen 250 of FIG. 9C is being displayed, the determiner 25 determines that the login user A requests for logging out. Based on this determination, the display control 24 displays, on the display 220, the end confirmation window 238 of FIG. 8C. When the user B, who is not logged in, brings the smart phone 4 into proximity to the near-distance communication device 221, unless the destination configuration screen 270 or the print configuration screen 260 is being displayed, the determiner 25 determines that such user operation is accidental. Based on this determination, the display control 24 displays, on the display 220, the error screen 180 of FIG. 14B.

Other examples of screen other than the destination configuration screen 270 and the print configuration screen 260 include, but not limited to, the drawing image screen 230 (FIG. 8A), the menu selection window 232 (FIG. 8B), the folder selection screen 240 (FIG. 9A), the file selection screen 245 (FIG. 9B), the email configuration screen 280 (FIG. 10B), and the QR code display screen 290 (FIG. 10C). In other words, for screens other than the screen for accepting an email transmission request and the screen for accepting a print request, the electronic whiteboard 2 displays an error screen in response to a detection of an operation of the user who is not logged in.

As described above, according to one or more embodiments, even when the electronic whiteboard 2 is shared by a plurality of users, the electronic whiteboard 2 authenticates the login user using the IC card (as an example of privately-owned terminal) that is privately owned by the login user, thus improving security.

For example, when the login user A brings his or her IC card 3 into proximity to the electronic whiteboard 2x, the end confirmation window 238 of FIG. 8C is displayed (S96-4). When the user B, who is not logged in, brings his or her smart phone 4 into proximity to the electronic whiteboard 2x, the error screen 180 of FIG. 14B is displayed (S96-2). That is, the login user A is able to easily log in or log out by bringing the IC card 3 close to the electronic whiteboard 2. In contrary, even when the user B, who is not logged in, brings his or her smart phone 4 close to the electronic whiteboard 2, the electronic whiteboard 2 does not allow the user B to log out.

Further, the configuration unit 27 sets the email address of the login user A, as an email sender address and an email destination address (S20), thus eliminating the need for manually inputting such information. When the user B, not logged in, brings the smart phone 4 into proximity to the near-distance communication device 221 while the display control 24 is displaying the destination configuration screen 270 illustrated in FIG. 10A, the display control 24 additionally displays, as illustrated in the destination configuration screen 270 (FIG. 14D), the email address of the user B (S40). Accordingly, the user B, who wants to have the drawing image data transmitted to the PC 10b, does not have to enter or select his or her email address, thus reducing the workload of the user.

The configuration unit 27 sets the user name of the login user A as a print requester. The display control 24 displays, on the print configuration screen 260, the user name of the login user A as a print requester (S51). Accordingly, the user A can easily set the print requester name. When the user B, not logged in, brings the smart phone 4 into proximity to the near-distance communication device 221 while the display control 24 is displaying the print configuration screen 260 illustrated in FIG. 9D, the display control 24 changes the print requester name on the print configuration screen 260, from the user name of the login user A to the user name of the user B (FIG. 21) (S56-4). Accordingly, the user B, who is not logged in, can easily print out an image based on the drawing image data. As described above, secure printing is used to print the image, which requires logging in of the user at the MFP 9 before printing. In such case, the user B, who has not logged in, is not able to print. As long as the user B brings his or her smart phone 4 into proximity to the electronic whiteboard 2x, the user B can easily log in such that the secure printing can be performed by the user B.

Figure 26:
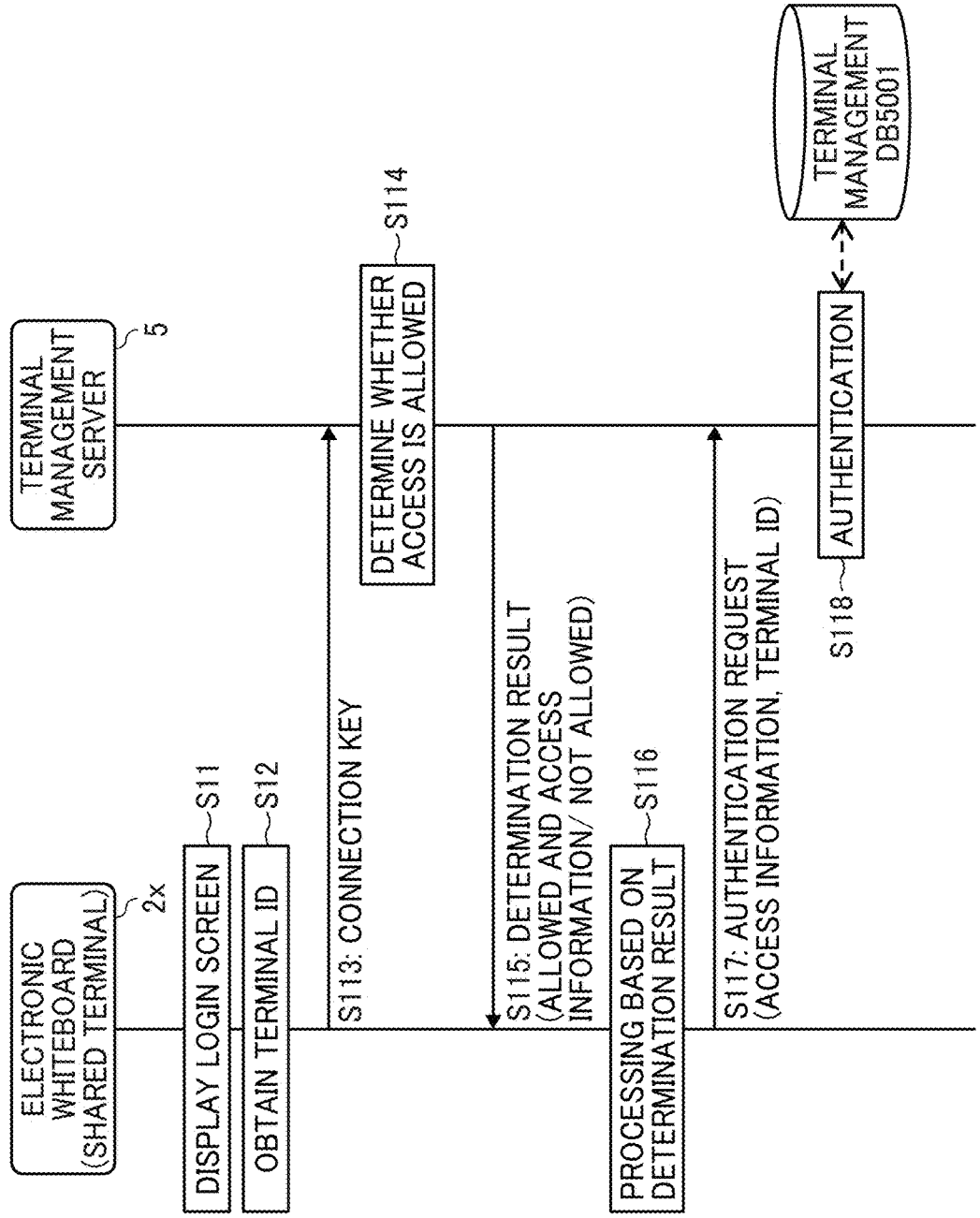
FIG. 26 is a sequence diagram illustrating operation of processing data communication, according to an embodiment.

Referring now to FIG. 26, operation of communicating data regarding an image is described according to another embodiment. In this embodiment, steps S13 and S14 of FIG. 13 are replaced by steps S13 to S117 of FIG. 26. For this reasons, the following describes operation of S113 to S117. In one example, there may be a plurality of terminal management servers 5.

When the obtainer and provider 28 of the electronic whiteboard 2x obtains the terminal ID of the IC card 3 from the obtainer and provider 38 of the IC card 3 at S12 of FIG. 13, referring to FIG. 26, the transmitter and receiver 21 of the electronic whiteboard 2x transmits a connection key k1 to the terminal management server 5 (S113). The terminal management server 5 receives the connection key k1 at the transmitter and receiver 51. The connection key k1 is issued as a client of the terminal management server 5 that possesses information for authentication, and stored in advance in the memory 2000 of the electronic whiteboard 2x.

The terminal management server 5 stores a connection key k2 that is issued in the memory 5000. The determiner 55 of the terminal management server 5 determines whether the received connection key k1 matches the stored connection key k2 to determine whether access is allowed (S114). When the determiner 55 determines that the connection key k1 matches the connection key k2, the determiner 55 determines that access is allowed. By contrast, when the determiner 55 determines that the connection key k1 does not match the connection key k2, the determiner 55 determines that access is not allowed.

Next, the transmitter and receiver 51 of the terminal management server 5 transmits a determination result to the electronic whiteboard 2x (S115). When the determiner 55 determines that access is allowed, the determination result includes information indicating that access is allowed and information a1. When the determiner 55 determines that access is not allowed, the determination result includes information indicating that access is not allowed. The electronic whiteboard 2x receives the determination result at the transmitter and receiver 21. The access information a1 is, for example, a unique random alphanumeric string of 16 characters, 32 characters, 64 characters or the like. The access information is information generated by the determiner 55 based on the determination by determiner 55 that access is allowed. The generated access information a1 is stored temporarily in the memory 5000 by the storing and reading processor 59.

Next, the electronic whiteboard 2x performs processing based on the determination result (S116). In one example, when the determination result includes information indicating that access is not allowed, the display control 24 controls the display 220 to display a message indicating that access is not allowed. By contrast, when the authentication result includes information indicating that access is allowed, the operation proceeds to S117. The following describes the case where the determination result includes the information indicating that access is allowed.

The transmitter and receiver 21 of the electronic whiteboard 2x transmits an authentication request to the terminal management server 5 (S117). The authentication request includes the terminal ID obtained at S12 and access information a2. The terminal management server 5 receives the authentication request at the transmitter and receiver 51.

The authenticator 52 of the terminal management server 5 authenticates the IC card 3 using the access information a2 and the terminal ID (S118). More specifically, the determiner 55 determines whether the received access information a2 matches the access information a1 that is temporarily stored in the memory 5000. When the determiner 55 determines that the access information a2 matches the access information a1, the authenticator 52 performs authentication in substantially the same manner as S14 described referring to FIG. 13. By contrast, when the determiner 55 determines that the received access information a2 does not match the access information a1 that is temporarily stored in the memory 5000), the authenticator 52 does not perform authentication. In this case, the transmitter and receiver 51 transmits, to the electronic whiteboard 2x, information indicating that the IC card 3 is not a legitimate IC card. Since operation after S118 is performed in substantially the same manner as described above referring to S14 and subsequent steps, description thereof is omitted.

In one example, the transmitter and receiver 51 may encrypt the access information a1 after S114, and transmit the encrypted access information a1 at S115.

As described above, in the second embodiment, the terminal management server 5 is able to determine whether the electronic whiteboard 2x (shared terminal) is a licensed and legitimate terminal, in addition to authentication using the terminal ID. Thus, the second embodiment further enables to provide a communication system whose security is improved.

Further, according to the embodiment described referring to FIG. 26, in a case in which there are a plurality of terminal management servers 5, when the electronic whiteboard 2x sends an authentication request to a terminal management server that does not generate the access information at SI 14, the electronic whiteboard 2x receives a response indicating that access is not allowed. This improved legitimacy by authentication.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in alternative to sending data of an image to be shared via email as an attachment file to the email, the electronic whiteboard 2x may send an email with a link to such image data via email. More specifically, the electronic whiteboard 2x stores the image data in any desired storage area on the network, and generates an email including a link to an address indicating the storage area where the image data is stored. The electronic whiteboard 2x further sends the email with the link, to the email address that is received from the destination management server 6. The address may be expressed by a URL, for example.

Further, the user may instruct the electronic whiteboard 2 to send by email or print using the MFP 9, any desired data regarding an image being displayed on the display 220 of the electronic whiteboard 2. Examples of such data regarding the image include, but not limited to, drawing image data that reflects drawings made by the user as described above, and non-drawing image data such as data of a presentation material as described above. For example, the data of the presentation material having additional drawing made by the user, may be transmitted via email or printed.

In another example, the electronic whiteboard 2 may send an email, or generate print data, based on image data of an electronic watermark, in addition to stroke data corresponding to the stroke data that reflects drawings made by the user. The electronic watermark data is any image, which is superimposed on a layer of the stroke data (that is, the drawing image data) for display to the user. The electronic watermark data may be stored in any desired memory, such as a memory of the electronic whiteboard 2. To make the stroke data visible to the user, the watermark data is displayed, for example, in partly transparent. For example, the image with the word "confidential" may be superimposed on the drawing image data, to warn the user that the drawing image data is confidential. When sending the drawing image data, which is displayed with the watermark data, the electronic whiteboard 2 may generate a PDF file of the drawing image data and the watermark data and send an email addressed to the email address of the user, attached with a file of the generated PDF file. Alternatively, the electronic whiteboard 2 may send an email with a link to the file of the generated PDF file. With the watermark being displayed with the drawing image data (or any other image data), the user is able to know that such image data is confidential information. Further, when sending the drawing image data for printing, which is displayed with the watermark data, the electronic whiteboard 2 may generate print data of the drawing image data and the watermark data, and send the print data to the MFP 9. With the watermark being printed with the drawing image data (or any other image data), the user is able to know that such image data is confidential information.

In another example, the electronic whiteboard 2 may display the image data, such as the drawing image data, without the electronic watermark data. When sending the drawing image data via email or for printing, the electronic whiteboard 2 may generate email data or print data of the drawing image data and the watermark data, and send such email data or print data. This improves visibility to the user during videoconferencing or any conferencing, while increasing a level of security when sending image data via email or printing image data.

As described above, examples of the data regarding the image include data of an image being displayed at the electronic whiteboard such as the drawing image data, the drawing image data with the watermark data, any presentation material, etc. Other examples of the data regarding the image include data relating to the displayed image such as the watermark data.

Examples of drawings made by the user include, but not limited to, characters, marks, figures, etc., which may be drawn by the user either manually or using any graphics processing tool.

Further, the drawing image data may be captured at a time when a user instruction for sending the drawing image data is received. Alternatively, the drawing image data may be obtained from a local memory of the electronic whiteboard 2. For instance, the user may instruct the electronic whiteboard 2 to send drawing image data, which has been previously stored in a memory or read out from a removable recording medium. In such case, the user may firstly cause the electronic whiteboard 2 to display such image on the display 220 to be shared by a plurality of uses.

Further, the above-described example case assumes that two users (user A and user B) instruct to send drawing image data for printing or email transmission. Alternatively, any number of users may instruct the electronic whiteboard 2 to send drawing image data for printing or email transmission.

Further, the communication system 1 may include more than one MFP 9. In such case, the electronic whiteboard 2 may allow the user to select one of the MFP 9 (or any other device capable of printing) as a destination of print data.

Furthermore, the print data management DB 8001 and the print data may be stored in the MFP 9, if the MFP 9 for printing is set by default. In such case, when the user brings his or her IC card 3 into proximity to the MFP 9, the MFP 9 authenticates the user, and when authentication is successful, the MFP 9 performs printing based on the print data obtained from its local memory.

Further, while the above-described example illustrates the example case in which the electronic whiteboard 2 is used as a shared terminal, various other devices may be used as the shared terminal. For example, any one of the above-described embodiments is also applicable to a projector that projects an image based on image data, and a videoconference terminal for transmitting and receiving image data and voice data to and from a plurality of terminals.

In one example, the projector may be input with drawings made by a user on a screen projected by the projector, using an electronic pen or a user's finger, for example. Further, the user is able to write on an image that is projected with the projector, such as an image of presentation material.

Similarly, in one example, the videoconference terminal may be input with drawings made by a user on a screen, which may be displayed or projected. For example, any writing made by the user, for example, on the electronic whiteboard or any material (such as paper or wall) may be captured using a camera of the videoconference terminal.

Further, any one of the above-described servers may be incorporated into one or any number of apparatuses. In one example, the terminal management server 5, which obtains the terminal identification information of the privately-owned terminal, may further request the destination management server 6 for an email address of the user who has logged in.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A terminal, comprising:
   circuitry to:
   control a touchscreen display to display an image; and
   obtain, from another terminal of a user, terminal identification information that identifies the other terminal;
   a transmitter to transmit, to a terminal management server, an authentication request to authenticate the other terminal, the authentication request including the terminal identification information of the other terminal; and
   a receiver to receive, from the terminal management server, an authentication result indicating whether the other terminal is authenticated, wherein
   in response to the authentication result indicating that the other terminal is a legitimate terminal, the circuitry:
   logs in the user to the terminal, and
   controls the touchscreen display to display a drawing start screen that allows the user to start to draw stroke data on the touchscreen display, and
   in response to the authentication result indicating that the other terminal is not a legitimate terminal, the circuitry:
   denies a login of the user to the terminal, and
   controls the touchscreen display to display an error screen that prohibits the user to start to draw stroke data on the touchscreen display.

2. The terminal of claim 1, wherein
the receiver further receives, from the terminal management server, the authentication result including a user name associated with the other terminal, and
the circuitry further controls the touchscreen display to display the user name.

3. The terminal of claim 1, wherein
the error screen includes an error message indicating that drawing of stroke data is prohibited.

4. The terminal of claim 1, wherein the other terminal includes at least one of an integrated circuit (IC) card and a smart phone.

5. The terminal of claim 1, wherein the terminal is an electronic whiteboard provided with the touchscreen display.

6. The terminal of claim 1, wherein the circuitry obtains the terminal identification information via near field communication with the other terminal.

7. The terminal of claim 1, wherein the receiver receives a request to output the input image in a portable document format (PDF).

8. The terminal of claim 1, wherein the touchscreen display does not display the drawing start screen unless the authentication result indicates that the other terminal is the legitimate terminal.

9. A communication system, comprising:
the terminal of claim 1; and
the terminal management server which is connected to the terminal through a network, the terminal management server including:
   a memory to store, for the user, terminal identification information in association with user identification information and a user name of the user; and
   second circuitry to generate the authentication result by determining whether the terminal identification information received from the terminal is stored in the memory.

10. A method for a terminal, the method comprising:
controlling a touchscreen display to display an image;
obtaining, from another terminal of a user, terminal identification information that identifies the other terminal;
transmitting, to a terminal management server, an authentication request to authenticate the other terminal, the authentication request including the terminal identification information of the other terminal;
receiving, from the terminal management server, an authentication result indicating whether the other terminal is authenticated;
in response to the authentication result indicating that the other terminal is a legitimate terminal:
   logging in the user to the terminal; and
   controlling the touchscreen display to display a drawing start screen that allows the user to start to draw stroke data on the touchscreen display; and
in response to the authentication result indicating that the other terminal is not a legitimate terminal:
   denying a login of the user to the terminal; and
   controlling the touchscreen display to display an error screen that prohibits the user to start to draw stroke data on the touchscreen display.

11. The method of claim 10, wherein
the authentication result, received from the terminal management server, includes a user name associated with the other terminal, and
the method further comprises controlling the touchscreen display to display the user name.

12. The method of claim 10, wherein
the error screen includes an error message indicating that drawing of stroke data is prohibited.

13. The method of claim 10, wherein the other terminal includes at least one of an integrated circuit (IC) card and a smart phone.

14. The method of claim 10, wherein the terminal is an electronic whiteboard provided with the touchscreen display.

15. The method of claim 10, wherein the obtaining the terminal identification information is performed via near field communication with the other terminal.

16. The method of claim 10, further comprising receiving a request to output the input image in a portable document format (PDF).

17. A non-transitory computer readable medium storing a plurality of computer executable instructions which, when executed by one or more processors of a terminal, cause the terminal to:
control a touchscreen display to display an image;
obtain, from another terminal of a user, terminal identification information that identifies the other terminal;
transmit, to a terminal management server, an authentication request to authenticate the other terminal, the authentication request including the terminal identification information of the other terminal;
receive, from the terminal management server, an authentication result indicating whether the other terminal is authenticated;
in response to the authentication result indicating that the other terminal is a legitimate terminal:
log in the user to the terminal; and
control the touchscreen display to display a drawing start screen that allows the user to start to draw stroke data on the touchscreen display; and
in response to the authentication result indicating that the other terminal is not a legitimate terminal:
deny a login of the user to the terminal; and
control the touchscreen display to display an error screen that prohibits the user to start to draw stroke data on the touchscreen display.

18. The non-transitory computer readable medium according to claim 17, wherein
the authentication result, received from the terminal management server, includes a user name associated with the other terminal, and
the terminal is further caused to control the touchscreen display to display the user name.

19. The non-transitory computer readable medium according to claim 17, wherein
the error screen includes an error message indicating that drawing of stroke data is prohibited.

20. The non-transitory computer readable medium according to claim 17, wherein the terminal obtains the terminal identification information via near field communication with the other terminal.

* * * * *